(12) United States Patent
Kondoh et al.

(10) Patent No.: US 7,948,464 B2
(45) Date of Patent: May 24, 2011

(54) MEMORY-TYPE LIQUID CRYSTAL DISPLAY DEVICE

(75) Inventors: Shinya Kondoh, Nishitokyo (JP); Akira Suguro, Fujimi (JP); Takashi Ihara, Nishitokyo (JP); Yuuji Yano, Kodaira (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1104 days.

(21) Appl. No.: 11/236,620

(22) Filed: Sep. 28, 2005

(65) Prior Publication Data

US 2006/0066545 A1  Mar. 30, 2006

(30) Foreign Application Priority Data

Sep. 29, 2004 (JP) ................................. 2004-284493
Feb. 21, 2005 (JP) ................................. 2005-043455

(51) Int. Cl.
*G09G 3/36* (2006.01)
(52) U.S. Cl. .......................................... 345/97; 345/93
(58) Field of Classification Search ............ 345/87–111; 349/133, 172
See application file for complete search history.

(56) References Cited

U.S. PATENT DOCUMENTS

| | | | | |
|---|---|---|---|---|
| 4,239,345 A * | 12/1980 | Berreman et al. | ............ | 349/179 |
| 5,140,412 A * | 8/1992 | Shishido et al. | ............ | 358/539 |
| 5,353,137 A * | 10/1994 | Tsuboyama et al. | ............ | 345/97 |
| 5,526,015 A * | 6/1996 | Tsuboyama et al. | ............ | 345/97 |
| 5,673,062 A * | 9/1997 | Katakura et al. | ............ | 345/95 |
| 5,684,503 A * | 11/1997 | Nomura et al. | ............ | 345/97 |
| 5,717,421 A * | 2/1998 | Katakura et al. | ............ | 345/101 |
| 5,835,075 A * | 11/1998 | Nomura et al. | ............ | 345/97 |
| 6,061,042 A * | 5/2000 | Takahashi et al. | ............ | 345/87 |
| 6,556,179 B2 * | 4/2003 | Iwane et al. | ............ | 345/87 |
| 2002/0063806 A1 * | 5/2002 | Ouchi et al. | ............ | 348/745 |
| 2002/0191137 A1 * | 12/2002 | Kondoh | ............ | 349/123 |

FOREIGN PATENT DOCUMENTS

| | | |
|---|---|---|
| JP | 02053026 A | 2/1990 |
| JP | 02-131286 | 5/1990 |
| JP | 06250151 A | 9/1994 |
| JP | 2507784 | 4/1996 |
| JP | 2738681 | 1/1998 |
| JP | 2003216128 A | 7/2003 |

* cited by examiner

*Primary Examiner* — Chanh Nguyen
*Assistant Examiner* — Long Pham
(74) *Attorney, Agent, or Firm* — Finnegan, Henderson, Farabow, Garrett & Dunner, L.L.P.

(57) ABSTRACT

An object of the present invention is to provide a memory-type liquid crystal display device capable of controlling a color to be displayed in a peripheral area without using display data based on which display is achieved in the peripheral area. The memory-type liquid crystal display device having a display area and a peripheral area located on the perimeter of the display area, comprising a memory-type liquid crystal provided between first and second substrates and has a first stable state and a second stable state, a first pixel disposed on the display area, a second pixel disposed on the peripheral area and a control unit that applies a reset pulse to a portion of the memory-type liquid crystal corresponding to the first and second pixel so that the portion of the memory-type liquid crystal corresponding to the first and second pixels becomes one of the first and second stable states at a reset period which resets a state of the memory-type liquid crystal, and controls the memory-type liquid crystal so that a portion of the memory-type liquid crystal corresponding to the second pixel maintains its stable state of the reset period at a frame period after the reset period.

20 Claims, 14 Drawing Sheets

Fig. 8
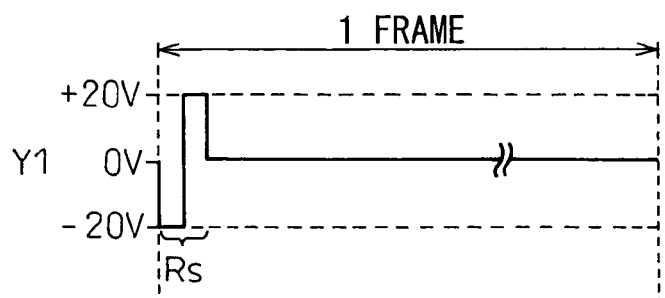
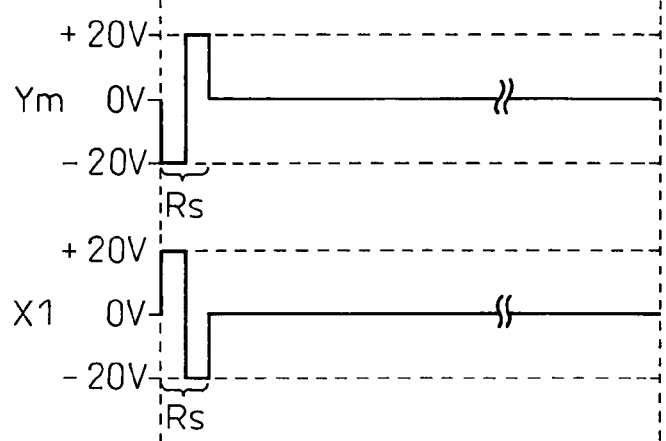
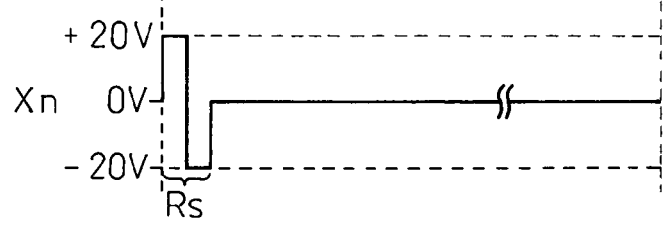

Fig. 9
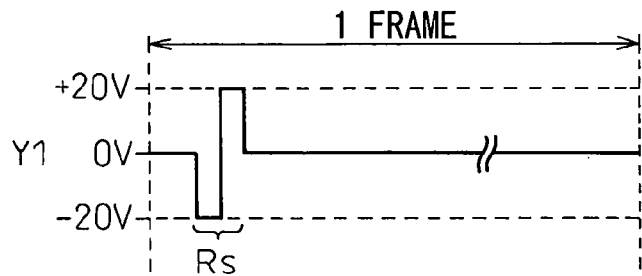
(a)
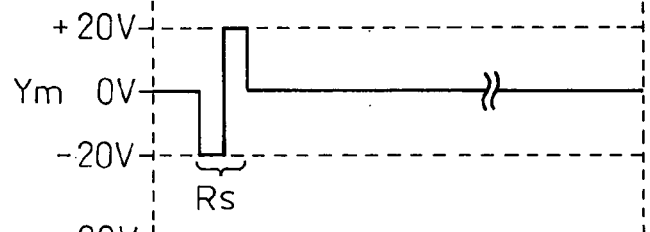
(b)
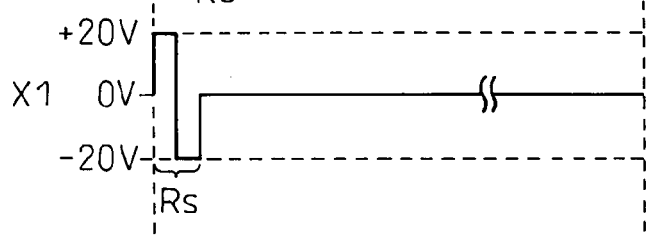
(c)
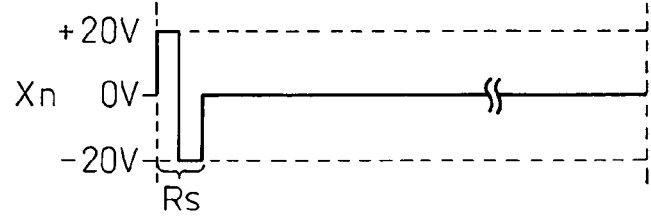
(d)

Fig.10
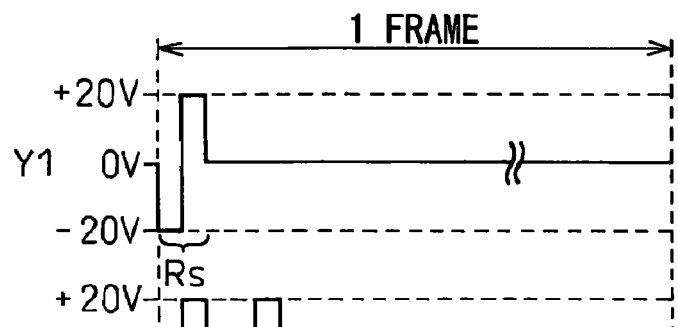
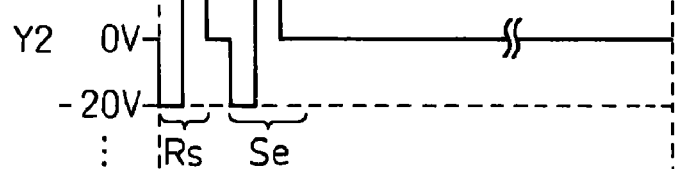
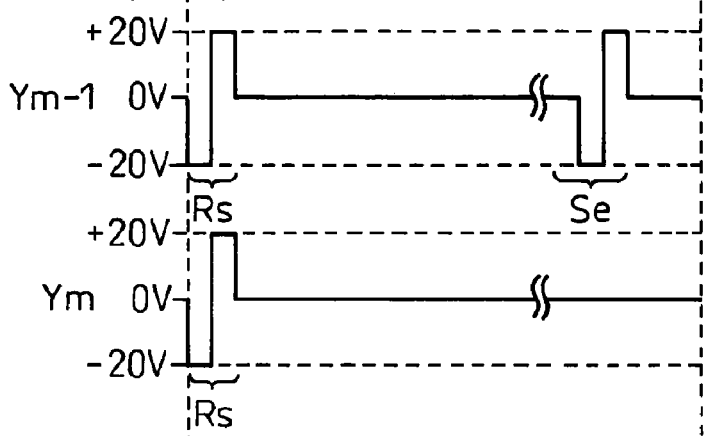
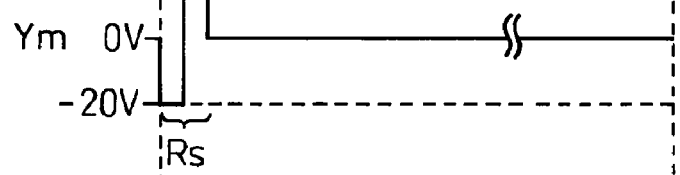
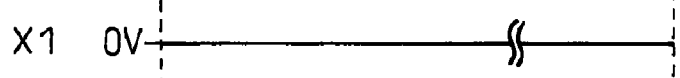
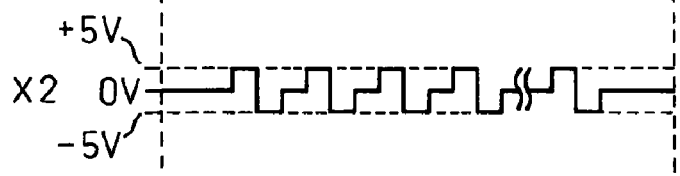
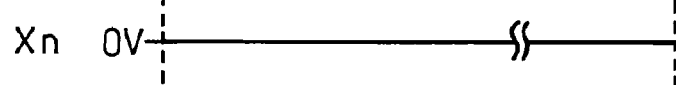

MEMORY-TYPE LIQUID CRYSTAL DISPLAY DEVICE

Applicant claims the right to priority based on Japanese Patent Applications No. 2004-284493, filed on Sep. 29, 2004 and No. 2005-043455, filed on Feb. 21, 2005.

FIELD OF THE INVENTION

The present invention relates to a liquid crystal display device employing a memory-type liquid crystal.

BACKGROUND OF THE INVENTION

Memory-type liquid crystals are characterized by the fact that they enter a plurality of optical states and sustain a specific state without application of a voltage (have the capability of a memory). Consequently, when a liquid crystal display device employs the memory-type liquid crystal, the liquid crystal display device can be controlled so that it will sustain a predetermined display without the application of a voltage. A display panel that employs the memory-type liquid crystal such as a ferroelectric liquid crystal so as to utilize the above characteristic of the memory-type liquid crystal is known to be controlled so that scanning electrodes associated with a portion of the surface of the display panel whose display should be modified will be driven but scanning electrodes associated with a portion thereof whose display need not be modified will not be driven (refer to, for example, Patent Document 1).

Normally, the surface of a display panel employing a memory-type liquid crystal is provided with a view plate that covers the perimeter of the surface. An area in the surface associated with the opening of the view plate is referred to as a display area in which display is achieved, and an area in the surface associated with the vicinity of the boundary of the opening formed in the view plate is referred to as a peripheral area. The memory-type liquid crystal has the capability of a memory as mentioned above. However, whichever of a plurality of optical states is sustained with no voltage applied is uncertain. If no driving electrode is associated with the peripheral area because the peripheral area is hardly seen externally, whether the portion of the memory-type liquid crystal coinciding with the peripheral area displays black or white cannot be controlled. The peripheral area coinciding with the uncontrolled portion of the memory-type liquid crystal may be seen from the end of the view plate.

Driving electrodes are therefore associated with the peripheral area, and driving data based on which of the driving electrodes associated with the peripheral area drive the associated portions of the liquid crystal is prepared. Thus, the peripheral area is controlled so that a predetermined color (white or black) will be displayed in the peripheral area (refer to, for example, Patent Document 2).

Moreover, according to a known technique, the driving electrodes associated with the peripheral area are made wider than those associated with the other area in order to cover the peripheral area using a small number of driving electrodes (refer to, for example, Patent Document 3).

Patent Document 1: JP-A-H02-131286 (pp. 11 and 12, FIG. 12)

Patent Document 2: JP-B-2738681 (FIG. 37C)

Patent Document 3: JP-B-2507784 (FIG. 4)

However, if a color to be displayed in the peripheral area is controlled using display data based on which display is achieved in the peripheral area on the display panel employing a memory-type liquid crystal, the display data, based on which display is achieved in the peripheral area, should be preserved independently.

Moreover, a liquid crystal display device has an optically functional film such as a sheet polarizer placed on the upper or lower side of a liquid crystal panel. For a reduction in the cost of a product, the optically functional film should preferably be as small as possible. If the optically functional film required for the liquid crystal display device is placed to cover an unnecessary area, the cost of the display device increases.

SUMMARY OF THE INVENTION

An object of the present invention is to provide a memory-type liquid crystal display device capable of controlling a color to be displayed in a peripheral area without using display data based on which display is achieved in the peripheral area.

Another object of the present invention is to provide a memory-type liquid crystal display device that has optimized a position at which a view plate is disposed, and that has overcome the drawback that display quality is impaired because an uncontrolled peripheral area is seen from the end of the view plate.

Still another object of the present invention is to provide a memory-type liquid crystal display device having an optically functional film disposed to cover only a minimum area needed for display.

A memory-type liquid crystal display device having a display area and a peripheral area located on the perimeter of the display area, comprising a memory-type liquid crystal provided between first and second substrates and has a first stable state and a second stable state, a first pixel disposed on the display area, a second pixel disposed on the peripheral area and a control unit that applies a reset pulse to a portion of the memory-type liquid crystal corresponding to the first and second pixel so that the portion of the memory-type liquid crystal corresponding to the first and second pixels becomes one of the first and second stable states at a reset period which resets a state of the memory-type liquid crystal, and controls the memory-type liquid crystal so that a portion of the memory-type liquid crystal corresponding to the second pixel maintains its stable state of the reset period at a frame period after the reset period.

Preferably, in the memory-type liquid crystal display device, further comprising a scanning electrodes in display area provided at a position corresponding to the first pixel, a signal electrodes in display area provided at a position corresponding to the first pixel, a scanning electrodes in peripheral area provided outside of the display area and corresponds to the second pixel and a signal electrodes in peripheral area provided outside of the display area and corresponds to the second pixel and wherein the control unit applies a voltage more than a threshold voltage, which reveres the state of the memory-type liquid crystal between the first and second stable state, to the scanning electrodes in display area, the signal electrodes in display area, the scanning electrodes in peripheral area and the signal electrodes in peripheral area corresponding to the second pixel.

Preferably, in the memory-type liquid crystal display device, further comprising a scanning electrodes in display area provided at a position corresponding to the first pixel, a signal electrodes in display area provided at a position corresponding to the first pixel, a scanning electrodes in peripheral area provided outside of the display area and corresponds to the second pixel and a signal electrodes in peripheral area provided outside of the display area and corresponds to the second pixel and wherein the control unit applies a reset pulse and a selection pulse to the scanning electrodes in display area, applies a data pulse to the signal electrodes in display area, only applies the reset pulse to the scanning electrodes in peripheral area, and only applies the reset pulse to the signal electrodes in peripheral area, so that a portion of the memory-type liquid crystal corresponding to the second pixel becomes one of the first and second stable states and a portion of the memory-type liquid crystal corresponding to the first pixel becomes one of the first and second stable states according to the selection pulse and data pulse.

Preferably, in the memory-type liquid crystal display device, further comprising a scanning electrodes in display area provided at a position corresponding to the first pixel, a signal electrodes in display area provided at a position corresponding to the first pixel, a scanning electrodes in peripheral area provided outside of the display area and corresponds to the second pixel and a signal electrodes in peripheral area provided outside of the display area and corresponds to the second pixel and wherein the control unit applies a reset pulse and a selection pulse to the scanning electrodes in display area, applies a data pulse to the signal electrodes in display area, applies the reset pulse to the scanning electrodes in peripheral area, and does not apply the reset pulse and signal pulse to the signal electrodes in peripheral area, so that a portion of the memory-type liquid crystal corresponding to the second pixel becomes one of the first and second stable states and a portion of the memory-type liquid crystal corresponding to the first pixel becomes one of the first and second stable states according to the selection pulse and data pulse.

Preferably, in the memory-type liquid crystal display device, the control unit applies the reset pulse simultaneously to the scanning electrodes in peripheral area and the signal electrodes in peripheral area. The display color to be produced by the portion of the memory-type liquid crystal corresponding to the peripheral area can be controlled for a short period of time.

Preferably, in the memory-type liquid crystal display device, the control unit applies the reset pulse to the scanning electrodes in peripheral area and the signal electrodes in peripheral area at different timings. This is intended to prevent application of a high voltage to a part of the memory-type liquid crystal.

Preferably, in the memory-type liquid crystal display device, when a voltage is initially applied to the scanning electrodes in display area and signal electrodes in display area, the control unit applies the reset pulse to the scanning electrodes in display area, signal electrodes in display area, scanning electrodes in peripheral area, or signal electrodes in peripheral area so as to bring the portion of the memory-type liquid crystal corresponding to the peripheral area to one of the first and second states. This is because, when the memory-type liquid crystal display device is initialized, a display color to be produced by the portion of the memory-type liquid crystal corresponding to the peripheral area is not determined.

Preferably, in the memory-type liquid crystal display device, when the temperature sensor detects a predetermined temperature, the control unit applies the reset pulse to the scanning electrodes in display area, signal electrodes in display area, scanning electrodes in peripheral area, or signal electrodes in peripheral area so as to bring the portion of the memory-type liquid crystal coinciding with the peripheral area to one of the first and second stable states. This is because, after the memory-type liquid crystal is tentatively placed in an environment in which a phase transition temperature is exceeded, if the temperature of the memory-type liquid crystal decreases to become equal to or lower than the phase transition temperature, a display color to be produced by the portion of the memory-type liquid crystal coinciding with the peripheral area is not determined.

Preferably, in the memory-type liquid crystal display device, when the reset pulse generating circuit generates the all-reset pulse, the control unit applies the reset pulse to the scanning electrodes in display area, signal electrodes in display area, scanning electrodes in peripheral area, or signal electrodes in peripheral area so as to bring the portion of the memory-type liquid crystal coinciding with the peripheral area to one of the first and second stable states. This is because, once the memory-type liquid crystal display device is reset, a display color to be produced by the portion of the memory-type liquid crystal coinciding with the peripheral area is not determined.

Preferably, in the memory-type liquid crystal display device, the control unit detects a display color exhibited by an index pixel contained in the display area, and applies the reset pulse to the scanning electrodes in display area, signal electrodes in display area, scanning electrodes in peripheral area, or signal electrodes in peripheral area so that the portion of the memory-type liquid crystal coinciding with the peripheral area will produce the same display color as the display color exhibited by the index pixel. Namely, the color to be displayed by the portion of the memory-type liquid crystal coinciding with the peripheral area is controlled based on the index pixel contained in the display area.

Preferably, in the memory-type liquid crystal display device, the control unit detects a display color exhibited by the largest number of pixels contained in the display area, and applies the reset pulse to the scanning electrodes in display area, signal electrodes in display area, scanning electrodes in peripheral area, or signal electrodes in peripheral area so that the portion of the memory-type liquid crystal coinciding with the peripheral area will produce the same display color as the display color exhibited by the largest number of pixels. Namely, the display color to be produced by the portion of the memory-type liquid crystal coinciding with the peripheral area is controlled based on the color (normally, a background color) exhibited by the largest number of pixels contained in the display area.

Preferably, in the memory-type liquid crystal display device, further comprising a scanning electrodes in display area provided at a position corresponding to the first pixel, a signal electrodes in display area provided at a position corresponding to the first pixel, a scanning electrodes in peripheral area provided outside of the display area and corresponds to the second pixel and a signal electrodes in peripheral area provided outside of the display area and corresponds to the second pixel and wherein the control unit applies a reset pulse and a selection pulse to the scanning electrodes in display area, applies a data pulse to the signal electrodes in display area, applies the reset pulse to the scanning electrodes in peripheral area, and applies the reset pulse to the signal electrodes in peripheral area, so that a portion of the memory-type liquid crystal corresponding to the second pixel becomes one of the first and second stable states continuously.

Preferably, in the memory-type liquid crystal display device, further comprising a view plate which covers a periphery of the first or second substrate and is placed on the external side of the first or second substrate, and wherein the boundary of an opening formed in the view plate is positioned on the periphery area.

Preferably, in the memory-type liquid crystal display device, the boundary of the opening of the view plate is aligned with a center line that bisects in width each of the scanning electrodes in peripheral area and signal electrodes in peripheral area that are associated with the peripheral area.

Preferably, in the memory-type liquid crystal display device, an optically functional film is attached to the external side of the first or second substrate so that it will cover positions associated with the display area and peripheral area respectively but it will be short of a position associated with an uncontrolled area located outside the peripheral area.

In efforts to solve the aforesaid problems, according to the present invention, there is provided a memory-type liquid crystal display device including: a memory-type liquid crystal layer clamped between first and second substrates and brought to a first stable state or a second stable state; scanning electrodes in display area disposed at a position on the first substrate associated with a display area; signal electrodes in display area disposed at a position on the second substrate associated with the display area; scanning electrodes in peripheral area disposed at a position on the first substrate, which is associated with a peripheral area, outside the scanning electrodes in display area; signal electrodes in peripheral area disposed at a position on the second substrate, which is associated with the peripheral area, outside the signal electrodes in display area; and a control unit that applies a reset pulse and a selection pulse to the scanning electrodes in display area, applies a data pulse to the signal electrodes in display area, applies the reset pulse alone to the scanning electrodes in peripheral area, applies the reset pulse alone to the signal electrodes in peripheral area, and thus extends control so that the portion of a memory-type liquid crystal associated with the peripheral area will enter either the first or second stable state, and the portion of the memory-type liquid crystal associated with the display area will enter either the first or second stable state according to the selection pulse and data pulse.

According to the present invention, a display color to be produced by the portion of the memory-type liquid crystal coinciding with the peripheral area defined on the perimeter of the display area is controlled according to a simple method for fear that a user may discern various colors produced by liquid crystalline molecules through the view plate. Consequently, the display to be achieved by the memory-type liquid crystal display device becomes refined and beautiful.

When the boundary of the opening formed in the view plate is aligned with the center line that bisects in width each of the scanning electrodes in peripheral area and signal electrodes in peripheral area, even if the view plate is deviated from the liquid crystal panel, the boundary of the opening of the view plate is positioned on the scanning electrode in peripheral area and signal electrode in peripheral area without fail. This leads to simple assembly during manufacture and an improved yield.

If the dimensions of an optically functional film are equal to those of a range surrounded by the scanning electrodes in peripheral area and signal electrodes in peripheral area, the optically functional film can be effectively disposed in a minimum area needed for display.

The memory-type liquid crystal has the molecules thereof oriented arbitrarily as long as no voltage is applied to the molecules. Even if an optically functional film is placed on the portion of the liquid crystal including the molecules, the optically functional film does not improve vision. The worst is that the optically functional film may degrade vision. Namely, the dimensions of the optically functional film which are larger than the dimensions of the range surrounded by the peripheral area electrodes may impair the vision of the display on the panel. Consequently, the optically functional film having the same dimensions as the dimensions of the range surrounded by the peripheral area electrodes is most advantageous for better vision. Furthermore, the area of the optically functional film can be made smaller than that of a conventional optically functional film, and the cost thereof can be reduced.

DESCRIPTION OF THE DRAWINGS

These and other features and advantages of the present invention will be better understood by reading the following detailed description, taken together with the drawings wherein:

FIG. 8 shows an example of a driving voltage application method to be implemented in a liquid crystal display device in accordance with the present invention;

FIG. 9 shows another example of the driving voltage application method to be implemented in the liquid crystal display device in accordance with the present invention;

FIG. 10 shows still another example of the driving voltage application method to be implemented in the liquid crystal display device in accordance with the present invention;

DESCRIPTION OF THE PREFERRED EMBODIMENTS

Figure 1:
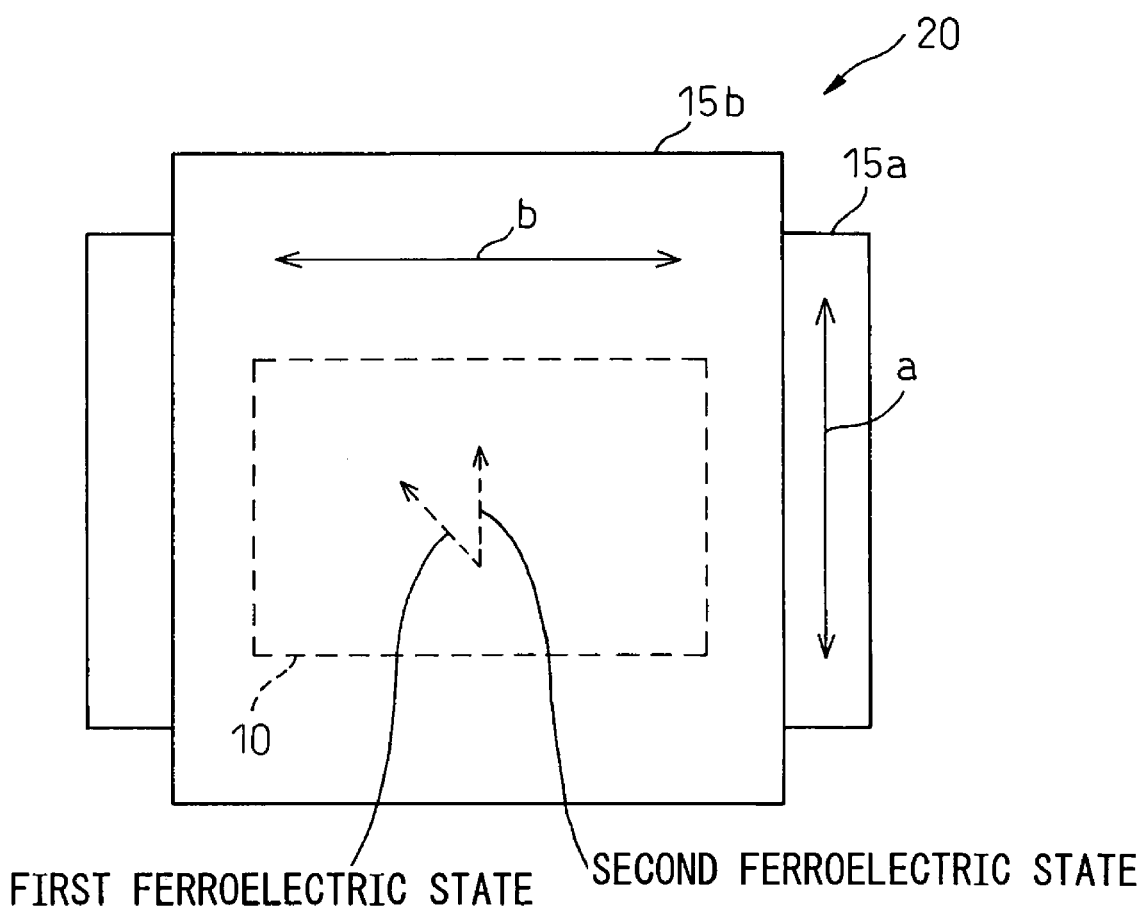
FIG. 1 shows an example of the construction of a liquid crystal panel.

Referring to the drawings, a liquid crystal display device 100 in accordance with the present invention will be described below.

To begin with, a memory-type liquid crystal will be described by taking a ferroelectric liquid crystal as an example. The memory-type liquid crystal is a liquid crystal that enters a plurality of optical states and is characteristic of sustaining a specific state despite no voltage being applied. For example, the memory-type liquid crystal refers to a ferroelectric liquid crystal or a cholesteric liquid crystal.

Ferroelectric liquid crystalline molecules are oriented in either of two directions, which are determined with the flank of a cone (liquid crystal cone) and in which the molecules are stable, with application of an external influence such as an electric field. When the ferroelectric liquid crystal is clamped between a pair of substrates and used as a liquid crystal display device, the ferroelectric liquid crystal is controlled so that the molecules will be oriented in either of the two directions, in which they are stable, by changing the polarities of a voltage to be applied to the ferroelectric liquid crystal. When the ferroelectric liquid crystalline molecules are oriented in either of the two directions in which they are stable, it can be said that the molecules are brought to a first ferroelectric state or a second ferroelectric state.

FIG. 1 shows an example of the construction of a liquid crystal panel 20 employing a ferroelectric liquid crystal 10. Referring to FIG. 1, sheet polarizers 15a (a denotes the direction of the axis of polarization) and 15b (b denotes the direction of the axis of polarization) are disposed at right angles in series with each other along the optical axis. The major axes of the molecules of the ferroelectric liquid crystal 10 brought to the second ferroelectric state are aligned with the axis of polarization a. Therefore, the direction of the major axes of the liquid crystalline molecules brought to the first ferroelectric state is, as shown in FIG. 1, the other direction determined with a liquid crystal cone.

After the sheet polarizers 15a and 15b and the ferroelectric liquid crystal 10 are, as shown in FIG. 1, arranged, the polarities of an applied voltage are changed in order to bring the ferroelectric liquid crystal 10 to the second ferroelectric state (the major axes of the molecules of the ferroelectric liquid crystal 10 are aligned with the axis of polarization a of the sheet polarizer 15a). In this case, as light is not transmitted, the liquid crystal panel 20 displays black (an interceptive state). The polarities of an applied voltage can be changed in order to bring the ferroelectric liquid crystal 10 to the first ferroelectric state (the major axes of the molecules of the ferroelectric liquid crystals 10 are aligned neither with the axis of polarization a of the sheet polarizer 15a nor the axis of polarization b of the sheet polarizer 51b). In this case, the direction of the major axes of the liquid crystalline molecules meets the axes of polarization at a certain angle. Consequently, light emanating from, for example, an auxiliary light source is transmitted by the liquid crystalline molecules. The liquid crystal panel 20 therefore displays white (transmissible state). For display, a light source other than the auxiliary light source may be utilized.

Next, switching of the states of the ferroelectric liquid crystal 10, that is, transition from one ferroelectric state to the other ferroelectric state will be described in conjunction with FIG. 2. As indicated with a curve A in FIG. 2, a voltage to be applied to the ferroelectric liquid crystal 10 is raised to have a value V1 that causes an optical transmittance to start increasing. The voltage is further raised to have a value V2 (positive threshold) that no longer causes the optical transmittance to increase. In contrast, the voltage to be applied to the ferroelectric liquid crystal 10 is lowered to have a value V3 that causes the optical transmittance to start decreasing. The voltage is further lowered to have a value V4 (negative threshold) that no longer causes the optical transmittance to decrease. A state in which the optical transmittance is high is referred to as the first ferroelectric state, and a state in which the optical transmittance is low is referred to as the second ferroelectric state.

For example, when a voltage whose value is equal to or larger than the value V2 is applied to the ferroelectric liquid crystal 10, the ferroelectric liquid crystal makes a transition to the first ferroelectric state. Thereafter, although no voltage is applied (a voltage of 0 V is applied), the ferroelectric liquid crystal sustains the first ferroelectric state. Likewise, when a voltage whose value is equal to or smaller than the value V4 is applied to the ferroelectric liquid crystal, the ferroelectric liquid crystal makes a transition to the second ferroelectric state. Thereafter, although no voltage is applied (that is, a voltage of 0 V is applied), the ferroelectric liquid crystal sustains the second ferroelectric state. Thus, after a voltage whose value is equal to or larger than the positive threshold or equal to or smaller than the negative threshold is applied to the ferroelectric liquid crystal in order to cause the ferroelectric liquid crystal to make a transition to a predetermined ferroelectric state, although no voltage is applied, the ferroelectric liquid crystal sustains the state.

Figure 3:
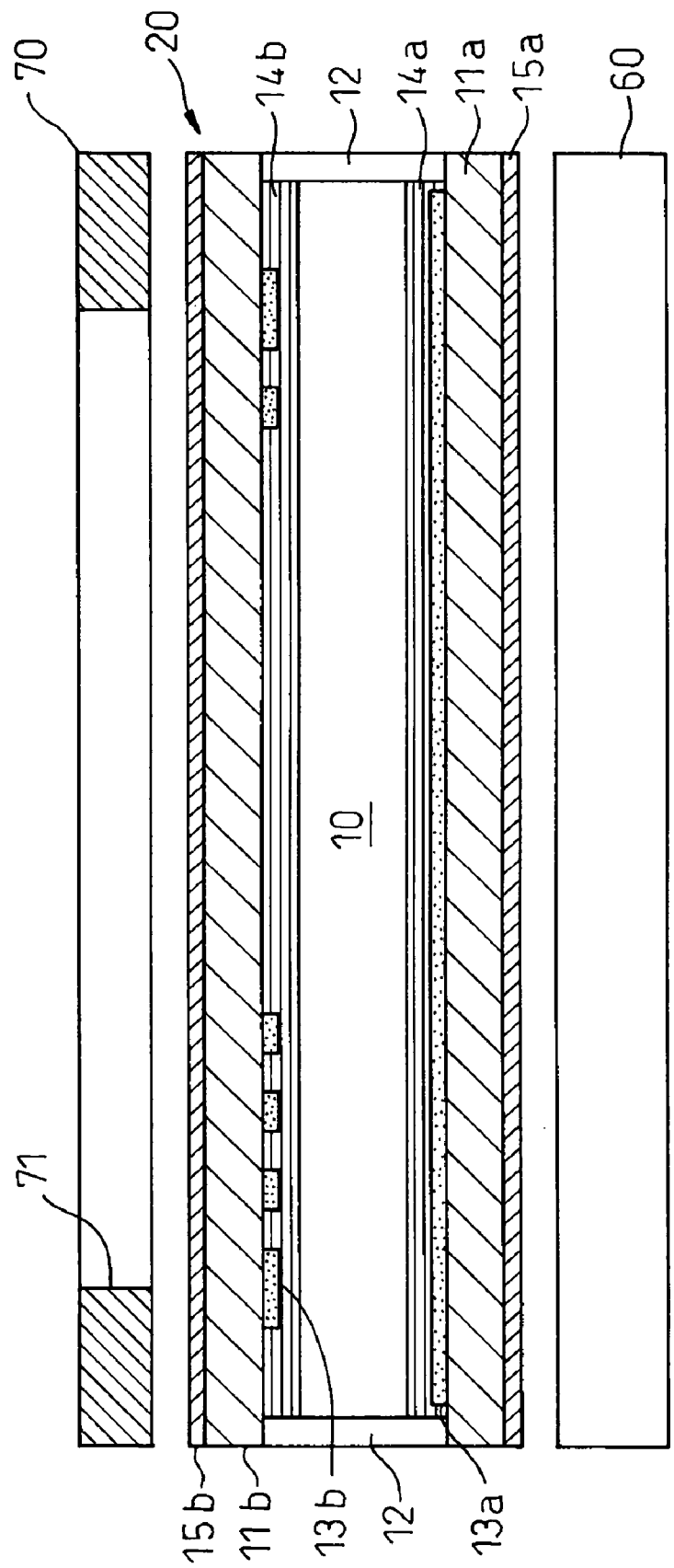
FIG. 3 is a conceptual diagram showing a section of a liquid crystal panel.

FIG. 3 is a sectional view showing the liquid crystal panel 20, an auxiliary light source 60, and a view plate 70 that are employed in the present invention. The liquid crystal panel 20 includes, as shown in FIG. 3, a first transparent glass substrate 11a, a second transparent glass substrate 11b, scanning electrodes 13a laid on the first transparent glass substrate 11a, signal electrodes 13b laid on the second transparent glass substrate 11b, a polymer alignment film 14a applied to the scanning electrodes 13a and rubbed, a polymer alignment film 14b applied to the signal electrodes 13b and rubbed, sealing members 12, a ferroelectric liquid crystal 10 cramped between the first and second transparent glass substrates 11a and 11b and sealed by the sealing members 12, a first sheet polarizer 15a placed on the external side of the first transparent glass substrate 11a, and a second sheet polarizer 15b placed on the external side of the second transparent glass substrate 11b.

As mentioned above, the axis of polarization a of the first sheet polarizer 15a is aligned with the major axes of the molecules of the ferroelectric liquid crystal 10 brought to the second ferroelectric state. Moreover, the second sheet polarizer 15b is disposed so that the axis of polarization b of the second sheet polarizer 15b will meet the axis of polarization a at right angles or 90°.

As the ferroelectric liquid crystal 10, Felix 501 manufactured by AZ Material Corp. is adopted. The ferroelectric liquid crystal 10 is clamped between the first and second transparent glass substrates 11a and 11b so that it will have a thickness of approximately 1.7 μm.

The auxiliary light source 60 is disposed below the sheet polarizer 15a. An organic electroluminescent (EL) cell is adopted as a light-emitting element in consideration of a low power consumption and thinness. Moreover, the view plate 70 has an opening 71 and is disposed to cover the peripheral area in the surface of the liquid crystal panel 20.

Figure 4:
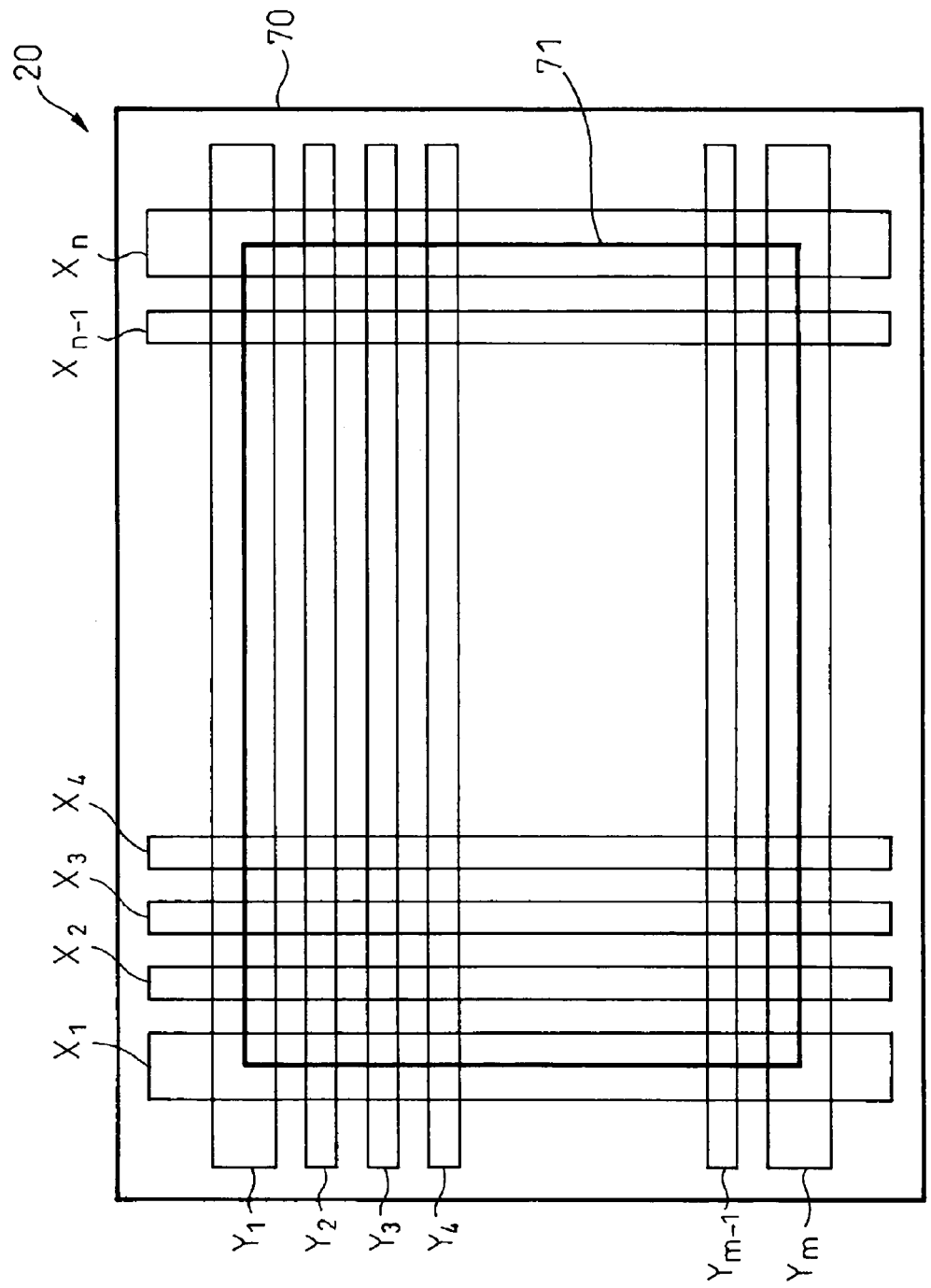
FIG. 4 shows an example of arrangement of driving electrodes incorporated in the liquid crystal panel.

FIG. 4 shows an example of arrangement of the scanning electrodes 13a, signal electrodes 13b, view plate, and sheet polarizers included in the liquid crystal panel 20 shown in FIG. 3.

In the example shown in FIG. 4, thirty-three scanning electrodes 13a (Y1 to Ym) and forty-nine signal electrodes 13b (X1 to Xn) are included. Therefore, in the drawing, Ym-1 corresponds to Y32, and Ym corresponds to Y33. Moreover, Xn-1 corresponds to X48, and Xn corresponds to X49. The scanning electrodes Y2 to Ym-1 serving as scanning electrodes in display area and the signal electrodes X2 to Xn-1 serving as signal electrodes in display area are associated with a display area fitted in the opening 71 of the view plate 70. Intersections between the scanning electrodes Y2 to Ym-1 and the signal electrodes X2 to Xn-1 shall be referred to as pixels (1457 pixels) contained in the liquid crystal panel 20.

The scanning electrodes Y1 and Ym serving as scanning electrodes in peripheral area and the signal electrodes X1 and Xn serving as signal electrodes in peripheral area are associated with a peripheral area (in the vicinity of the boundary of the opening 71 of the view plate 70) defined on the perimeter of the display area. The width of the scanning electrodes in peripheral area Y1 and Ym and the signal electrodes in peripheral area X1 and Xn is double the width of the other electrodes so that each of the peripheral area electrodes can cover a wide range. As shown in FIG. 3 and FIG. 4, the boundary of the opening 71 of the view plate 70 is aligned with a center line that substantially bisects in width each of the scanning electrodes Y1 and Ym and the signal electrodes X1 and Xn. A display color to be produced by the portion of the ferroelectric liquid crystal 10 coinciding with the peripheral area on the liquid crystal panel 20 is controlled using the scanning electrodes in peripheral area Y1 and Ym and the signal electrodes in peripheral area X1 and Xn which are located at outermost positions. Intersections between the scanning electrodes in peripheral area Y1 and Ym and the signal electrodes in peripheral area X1 and Xn can be referred to as pixels (160 pixels=31×2+49×2) corresponding to the display area in the liquid crystal panel 20.

As mentioned above, the boundary of the opening 71 of the view plate 70 is aligned with a center line that substantially bisects, in width, each of the scanning electrodes in peripheral area Y1 and Y33 and the signal electrodes in peripheral area X1 and X49. When the view plate 70 is placed on the upper side of the second transparent glass substrate 11b, even if the view plate 70 is slightly deviated from the right position, the boundary of the opening formed in the view plate is positioned on the peripheral area without fail. Consequently, when the view plate 70 is disposed so that the internal boundary thereof will be aligned with a center line that substantially bisects, in width, each of the electrodes, the surface of the liquid crystal panel has the largest margin. The presence of the view plate will not affect display definition.

Thereafter, as shown in FIG. 3 and FIG. 4, the sheet polarizers 15a and 15b are placed on the external sides of the first glass substrate 11a and second glass substrate 11b respectively. The sheet polarizers 15a and 15b are disposed so that the external boundaries thereof will extend outside the scanning electrodes in peripheral area Y1 and Ym and the signal electrodes in peripheral area X1 and Xn. The portion of the ferroelectric liquid crystal 10 coinciding with the perimeter of the liquid crystal panel 20 does not produce black, white, or any other display because the sheet polarizers do not reach the perimeter.

As mentioned above, the sheet polarizers 15a and 15b are disposed to cover the display area and peripheral area. In other words, the sheet polarizers 15a and 15b are disposed so that they will cover the peripheral area electrodes but will not cover an uncontrolled area that coincides with the outside of the peripheral area electrodes. This disposition makes it possible to display neither black nor white in an area having nothing to do with display. Moreover, as the sheet polarizers may be smaller in size than the substrates, a sheet polarizer having a minimum area can be adopted in order to realize a low cost.

In the present embodiment, the sheet polarizers 15a and 15b that are smaller in size than the substrates are disposed to cover the peripheral area electrodes. Alternatively, only one of the sheet polarizers may be disposed to cover the peripheral area electrodes. Even in this case, the same advantages can be provided.

Figure 5:
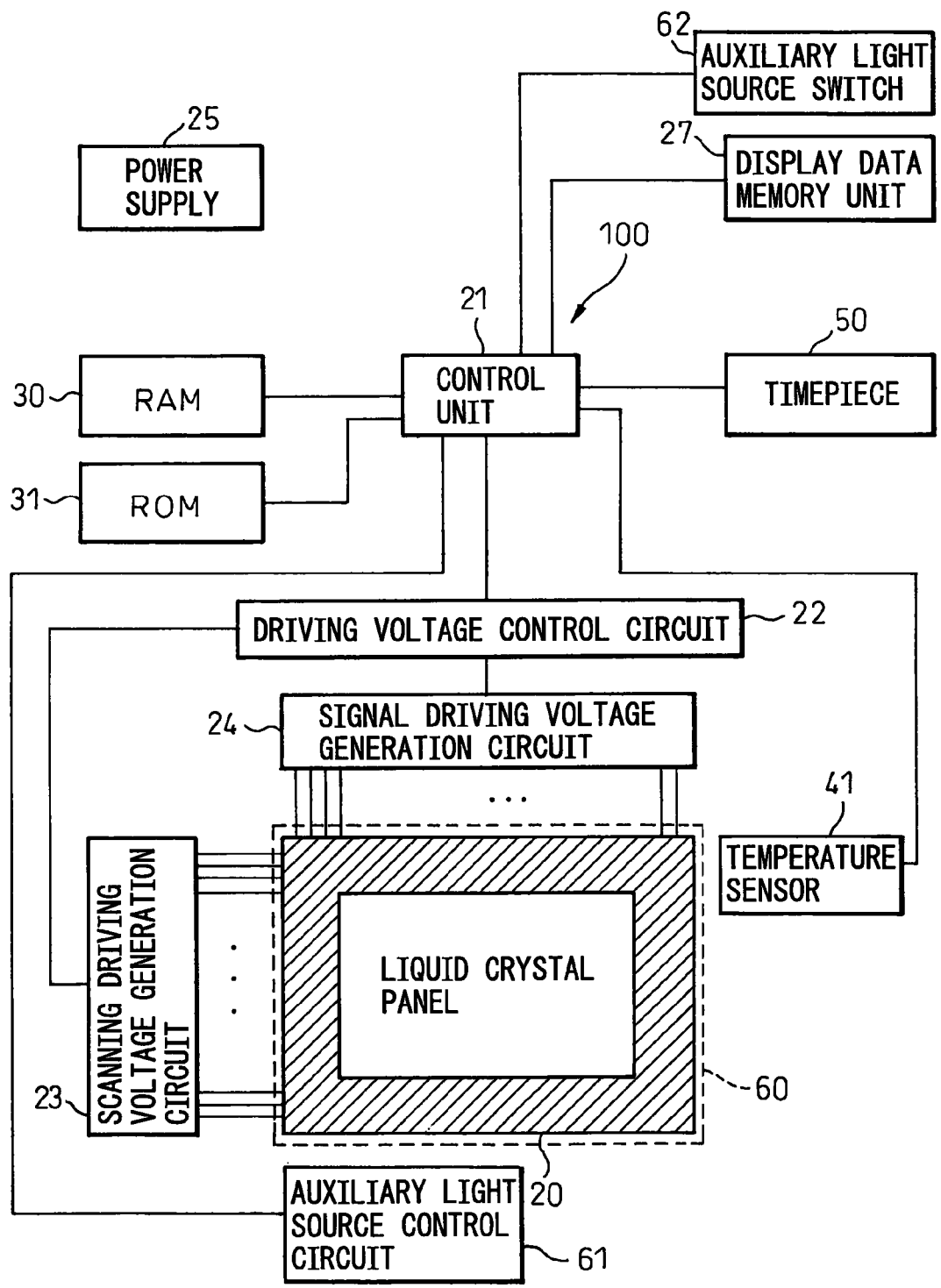
FIG. 5 is a block diagram of a liquid crystal display device.

FIG. 5 is a schematic block diagram showing a liquid crystal display device 100 in accordance with the present invention.

The liquid crystal display device 100 includes: a liquid crystal panel 20; a control unit 21; a driving voltage control circuit 22; a scanning driving voltage generation circuit 23 for applying a voltage to the scanning electrodes 13a (X1 to Xn); a signal driving voltage generation circuit 24 for applying a voltage to the signal electrodes 13b (Y1 to Ym); a power supply unit 25 composed of a solar cell and a secondary cell; a display data memory unit 27; a RAM 30, a ROM 31; a temperature sensor 41 that detects the ambient temperature of the liquid crystal panel 20; and a timepiece 50. Moreover, the liquid crystal display device 100 includes an auxiliary light source 60 disposed on the side of the sheet polarizer 15a incorporated in the liquid crystal panel, an auxiliary light source control circuit 61 that controls the on and off states of the auxiliary light source, and an auxiliary light source switch 62 which a user manipulates to turn on or off the auxiliary light source.

The control unit 21 produces display data using information on the time received from the timepiece 50 according to a program stored in advance in the RAM 30 or ROM 31, and stores the display data in the display data memory unit 27. The control unit 21 transmits a control signal to the driving voltage control circuit 22 so that an image will be displayed on the liquid crystal panel 20 according to the display data associated with the information on a time instant. The timepiece 50 is designed to transmit an all-reset signal, with which the liquid crystal panel 20 is reset, at the time of completion of overhaul, assembling, or repair. The components of the liquid crystal display device 100 are supplied power from the power supply unit 25, though it is not shown in FIG. 5.

Moreover, the control unit 21 checks the temperature of the ferroelectric liquid crystal 10 on the basis of an output signal of the temperature sensor 41. If the temperature exceeds a transition temperature at which the liquid crystal changes from a smectic C phase to a smectic A phase, the control unit 21 changes display control methods. Moreover, when the ambient environment of the liquid crystal display device 100 is dark, if a user turns on the auxiliary light source switch 62, the control unit 21 controls the auxiliary light source 61 to turn on the auxiliary light source 60.

Figure 6:
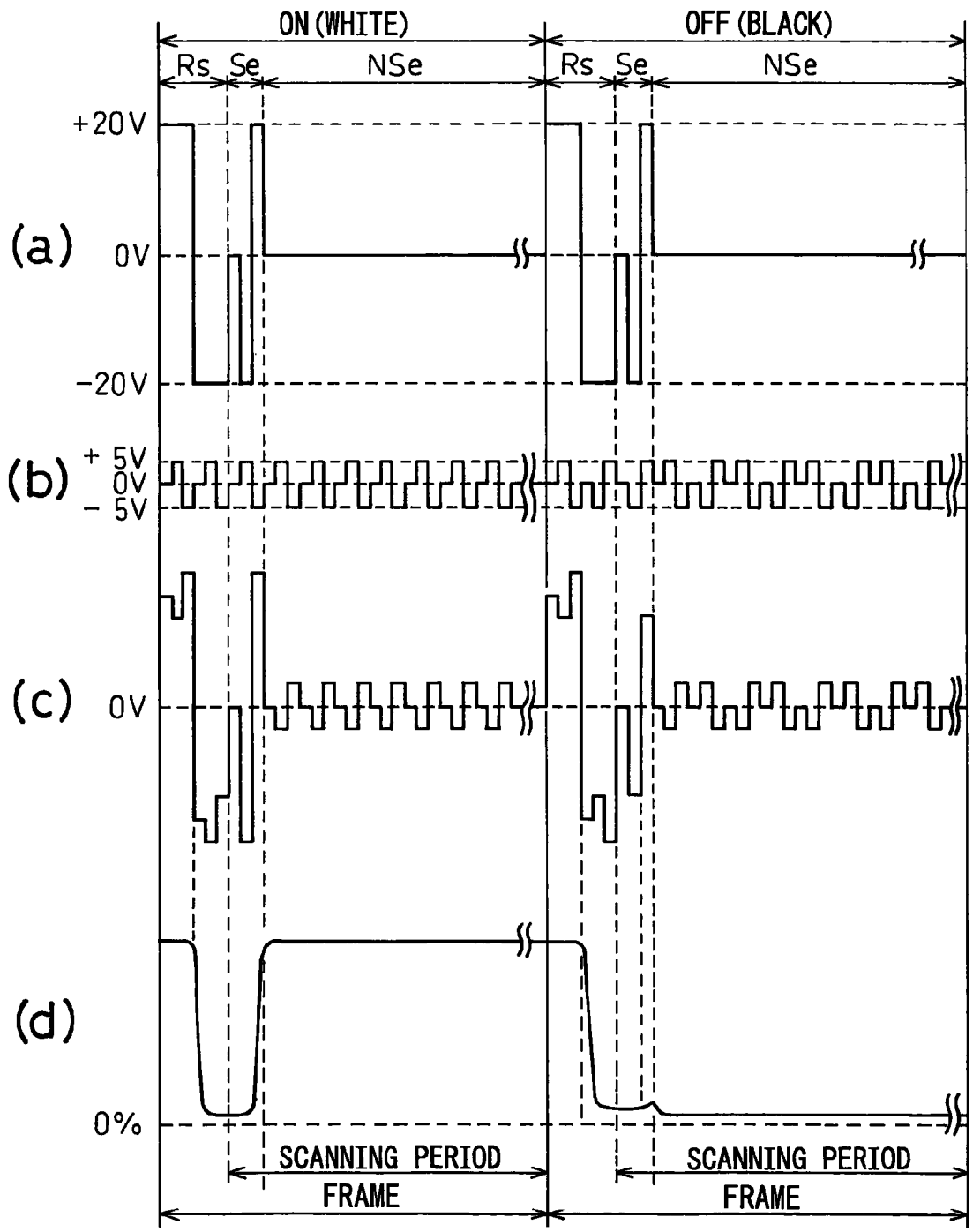
FIG. 6 shows an example of the waveforms of driving voltages to be applied to the liquid crystal panel.

FIG. 6 shows examples of the waveforms of driving voltages applied to each pixel contained in the liquid crystal panel 20.

FIG. 6(a) shows an example of the waveforms of a scanning voltage to be applied to one scanning electrode 13a. FIG. 6(b) shows an example of the waveform of a signal voltage to be applied to one signal electrode 13b. FIG. 6(c) shows the waveform of a composite voltage composed of the waveforms (a) and (b). FIG. 6(d) shows an example of the optical transmittance exhibited by a pixel to which the composite voltage having the waveform (c) is applied.

FIG. 6 shows the waveforms of driving voltages applied during two frames. In the drawing, ON signifies white display, and OFF signifies black display. Herein, one scanning period is used to execute display according to one display data. One frame is composed of a reset period (Rs) and a scanning period. One scanning period is composed of a selection period (Se) and a non-selection period (NSe).

During the first half of the reset period (Rs), irrespective of the immediately preceding display state, the ferroelectric liquid crystal 10 is forcibly reset to the first ferroelectric state of a white display (transmissible state). During the second half of the reset period (Rs), the ferroelectric liquid crystal 10 is forcibly reset to the second ferroelectric state of a black display (non-transmissible state). According to the waveform (a) of a scanning voltage, a reset pulse of +20 V is applied during the first half of the reset period (Rs), and a reset pulse of −20 V is applied during the second half thereof. According to the waveform (b) of a signal voltage, a signal pulse composed of a pulse of +5 V and a pulse of −5 V is repeatedly applied. Consequently, as seen from the waveform (c) of a composite voltage, a voltage whose value is equal to or larger than the positive threshold V2 (see FIG. 2) is applied to each of pixels involving the ferroelectric liquid crystal 10 during the first half of the reset period (Rs). A voltage whose value is equal to or smaller than the negative threshold V4 (see FIG. 2) is applied thereto during the second half thereof. The pixels are reset to the respective ferroelectric states during the first and second halves of the reset period. Owing to the reset period, an excellent display persists on the liquid crystal panel employing the ferroelectric liquid crystal.

When display data based on which a predetermined pixel exhibits a display color represents an on state (white display), a composite voltage (c) whose value is equal to or larger than the positive threshold V2 and which is composed of a selection pulse (see FIG. 6(a)) and a signal pulse (see FIG. 6(b)) is applied to the pixel. The portion of the ferroelectric liquid crystal 10 associated with the pixel is selected and set to the first ferroelectric state of white display (transmissible state). During the non-selection period (NSe), the state is sustained and white display persists.

When display data based on which a predetermined pixel exhibits a display color represents an off state (black display), a composite voltage (c) whose value is equal to or smaller than the negative threshold V4 is applied to the pixel during the selection period (Se). The portion of the ferroelectric liquid crystal 10 associated with the pixel is selected and set to the second ferroelectric state of black display (non-transmissible state). During the non-selection period (NSe), the state is sustained and black display persists.

Figure 7:
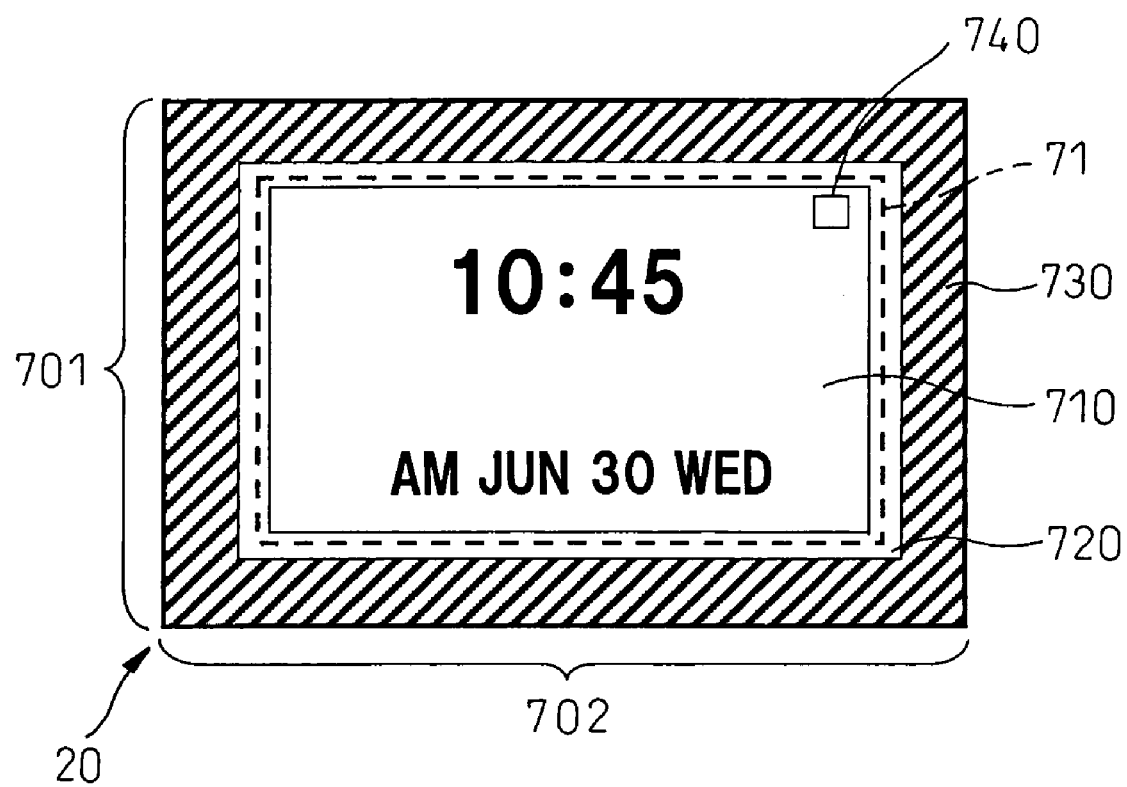
FIG. 7 shows an example of an image displayed on the liquid crystal display device.

FIG. 7 shows an example of display achieved by the liquid crystal panel 20 employed in the present embodiment.

In the drawing, reference numeral 701 denotes the side of a terminal of one of the scanning electrodes 13a, and reference numeral 702 denotes the side of a terminal of one of the signal electrodes 13b. A dashed line 71 indicates the opening formed in the view plate 70. Moreover, reference numeral 710 denotes a display area. Reference numeral 720 denotes a peripheral area coinciding with the portion of the memory-type liquid crystal 10 controlled by the outermost scanning electrodes Y1 and Ym and the outermost signal electrodes X1 and Xn. Reference numeral 730 denotes an uncontrolled area outside the peripheral area. Furthermore, reference numeral 740 denotes an index pixel contained in the display area 710. The dashed line 71 is drawn to nearly bisect, in width, the peripheral area 720. Moreover, the sheet polarizers are placed to cover the display area 710 and peripheral area 720 but do not cover the uncontrolled area 730.

In the present embodiment, the peripheral area 720 is an area which a user may discern if the view plate 70 is not positioned in place, that is, an area seen through the gap between the opening 71 of the view plate 70 and the surface of the liquid crystal panel. Therefore, a color displayed in the area is controlled according to a method described below.

FIG. 8 shows the first examples of the waveforms of driving voltages which the control unit 21 applies so as to control the color to be displayed in the peripheral area on the liquid crystal panel 20.

FIG. 8(a) and FIG. 8(b) show the waveforms of voltages to be applied to the outermost scanning electrodes in peripheral area Y1 and Ym respectively via the scanning driving voltage generation circuit 23 during one frame. FIG. 8(c) and FIG. 8(d) show the waveforms of voltages to be applied to the outermost signal electrodes in peripheral area X1 and Xn via the signal driving voltage generation circuit 24 during one frame.

In the first examples of the waveforms of driving voltages shown in FIG. 8, according to the waveforms (a) and (b) of scanning voltages, a reset pulse of −20 V is applied during the first half of a reset period (Rs), and a reset pulse of +20 V is applied during the second half thereof. According to the waveforms (c) and (d) of scanning voltages, the reset pulse of +20 V is applied during the first half of the reset period (Rs), and the reset pulse of −20 V is applied during the second half thereof. Consequently, a voltage whose value is equal to or smaller than the threshold V4 (see FIG. 2) is applied to the portion of the ferroelectric liquid crystal 10, which coincides with the peripheral area and is controlled by the outermost scanning electrodes Y1 and Ym and the outermost signal electrodes X1 and Xn, during the first half of the reset period. A voltage whose value is equal to or larger than the threshold V2 (see FIG. 2) is applied thereto during the second half of the reset period. Thus, the portion of the ferroelectric liquid crystal is set to the first ferroelectric state (white display) and will sustain the state.

FIG. 8 does not show the waveforms of driving voltages to be applied to the scanning electrodes in display area Y2 to Ym-1 and the signal electrodes in display area X2 to Xn-1 other than the outermost scanning electrodes in peripheral area Y1 and Ym and the outermost signal electrodes in peripheral area X1 and Xn. However, a composite driving voltage composed of a predetermined selection pulse and a predetermined signal pulse is applied thereto, and display is achieved based on an indication of the time received from the timepiece 50. No reset pulse shall be applied to each of the scanning electrodes in display area Y2 to Ym-1 which intersect the signal electrodes in peripheral area (X1 and Xn) or each of the signal electrodes in display area X2 to Xn-1 which intersect the perimetric scanning electrodes (Y1 and Ym) at the timing that a reset pulse is applied to each of the signal electrodes in peripheral area (X1 and Xn) or each of the perimetric scanning electrodes (Y1 and Ym).

According to the first method of applying driving voltages shown in FIG. 8, only a reset pulse is applied to each of the outermost scanning electrodes and signal electrodes so that the peripheral area (720 in FIG. 7) will sustain a white display. Consequently, a predetermined color is displayed on the border between the peripheral area and the display area on the liquid crystal panel 20. Eventually, a well-ordered display persists.

FIG. 9 shows the second examples of waveforms of driving voltages which the control unit 21 applies so as to control a color to be displayed in the peripheral area on the liquid crystal panel 20.

FIG. 9(a) and FIG. 9(b) show the waveforms of voltages to be applied to the outermost perimetric scanning electrodes Y1 and Ym respectively via the scanning driving voltage generation circuit 23 during one frame. FIG. 9(c) and FIG. 9(d) show the waveforms of voltages to be applied to the outermost signal electrodes in peripheral area X1 and Xn via the signal driving voltage generation circuit 24 during one frame.

In the second examples of driving voltages shown in FIG. 9, according to the waveforms (c) and (d) of signal voltages, a reset pulse of +20 V is applied during the first half of the first reset period (Rs), and a reset pulse of −20 V is applied during the second half thereof. According to the waveforms (a) and (b) of scanning voltages, a reset pulse of −20 V is applied during the first half of the second reset period (Rs), and a reset pulse of +20 V is applied during the second half thereof. Consequently, a voltage whose value is equal to or smaller than the threshold V4 (see FIG. 2) is applied to the portion of the ferroelectric liquid crystal 10 which coincides with part of the peripheral area (720 in FIG. 7) and which is controlled by the outermost signal electrodes X1 and Xn during the first half of the first reset period, and a voltage whose value is equal to or larger than the threshold V2 (see FIG. 2) is applied thereto during the second half thereof. Moreover, a voltage whose value is equal to or smaller than the threshold V4 (see FIG. 2) is applied to the portion of the ferroelectric liquid crystal 10 which coincides with part of the peripheral area (720 in FIG. 7) and which is controlled by the outermost scanning electrodes Y1 and Ym during the first half of the second reset period, and a voltage whose value is equal to or larger than the threshold V2 (see FIG. 2) is applied thereto during the second half thereof. The portion of the ferroelectric liquid crystal coinciding with the entire peripheral area (720 in FIG. 7) are set to the first ferroelectric state (white display) during the first and second reset periods, and will sustain the state.

FIG. 9 does not show the waveforms of driving voltages to be applied to the scanning electrodes in display area Y2 to Ym-1 and the signal electrodes in display area X2 to Xn-1 other than the outermost scanning electrodes in peripheral area Y1 and Ym and the outermost signal electrodes in peripheral area X1 and Xn. However, a composite driving voltage composed of a predetermined selection pulse and a predetermined signal pulse is applied to the display area electrodes, and an image is displayed on the display area on the liquid crystal panel 20 (710 in FIG. 7) according to an indication of the time received from the timepiece 50. Incidentally, no reset pulse is applied to each of the scanning electrodes in display area Y2 to Ym-1 which intersect the signal electrodes in peripheral area (X1 and Xn) or each of the signal electrodes in display area X2 to Xn-1 which intersect the scanning electrodes in peripheral area (Y1 and Ym) at the timing that a reset pulse is applied to each of the signal electrodes in peripheral area (X1 and Xn) or each of the scanning electrodes in peripheral area (Y1 and Ym).

According to the second method of applying driving voltages shown in FIG. 9, only a reset pulse is applied independently to the outermost scanning electrodes and the outermost signal electrodes so that the peripheral area (720 in FIG. 7) will sustain a white display. Consequently, a predetermined color is displayed on the border between the peripheral area and display area on the liquid crystal panel 20. Thus, well-ordered display persists.

A reset pulse is applied to the outermost scanning electrodes and the outermost signal electrode at different timings. This is because, if the reset pulse is simultaneously applied to the outermost electrodes as shown in FIG. 8, a voltage whose value is double the value of a voltage applied to positions other than the intersections between the scanning electrodes and signal electrodes is applied to the intersections. The voltage value may exceed a voltage value which the ferroelectric liquid crystal 10 can withstand. Therefore, the method shown in FIG. 9 applies the rest pulse at two timings.

FIG. 10 shows the third examples of waveforms of driving voltages which the control unit 21 applies so as to control a color to be displayed in the peripheral area on the liquid crystal panel 20.

FIG. 10(a) to FIG. 10(d) show the waveforms of voltages to be applied to the scanning electrodes Y1, Y2, Ym-1, and Ym via the scanning driving voltage generation circuit 23 during one frame. FIG. 10(e) to FIG. 10(h) show the waveforms of voltages to be applied to the signal electrodes X1, X2, Xn-1, and Xn via the signal driving voltage generation circuit 24 during one frame.

In the third examples of the waveforms of driving voltages shown in FIG. 10, according to the waveforms (a) to (d), a reset pulse of –20 V is applied to all the scanning electrodes Y1 to Ym during the first half of the reset period (Rs), and a reset pulse of +20 V is applied thereto during the second half thereof. Moreover, a voltage of 0 V is applied to all signal electrodes X1 to Xn during the reset period, and a voltage of 0 V is applied to the outermost signal electrodes X1 and Xn during one frame. Consequently, a voltage whose value is equal to or smaller than the threshold V4 (see FIG. 2) is applied to the ferroelectric liquid crystal coinciding with all the areas (display area and peripheral area), which are associated with the scanning electrodes and signal electrodes, during the first half of the reset period. A voltage whose value is equal to or larger than the threshold V2 (see FIG. 2) is applied thereto during the second half thereof. Thus, the ferroelectric liquid crystal is set to the first ferroelectric state (white display), and will sustain the state.

FIG. 10 does not show the waveforms of driving voltages to be applied to the scanning electrodes Y3 to Ym-2 and the signal electrodes X3 to Xn-2. A composite driving voltage composed of a predetermined selection pulse and a predetermined signal pulse is applied to the electrodes, and an image is displayed in the display area (710 in FIG. 7) on the liquid crystal panel 20 according to an indication of the time received from the timepiece 50.

Figure 11:
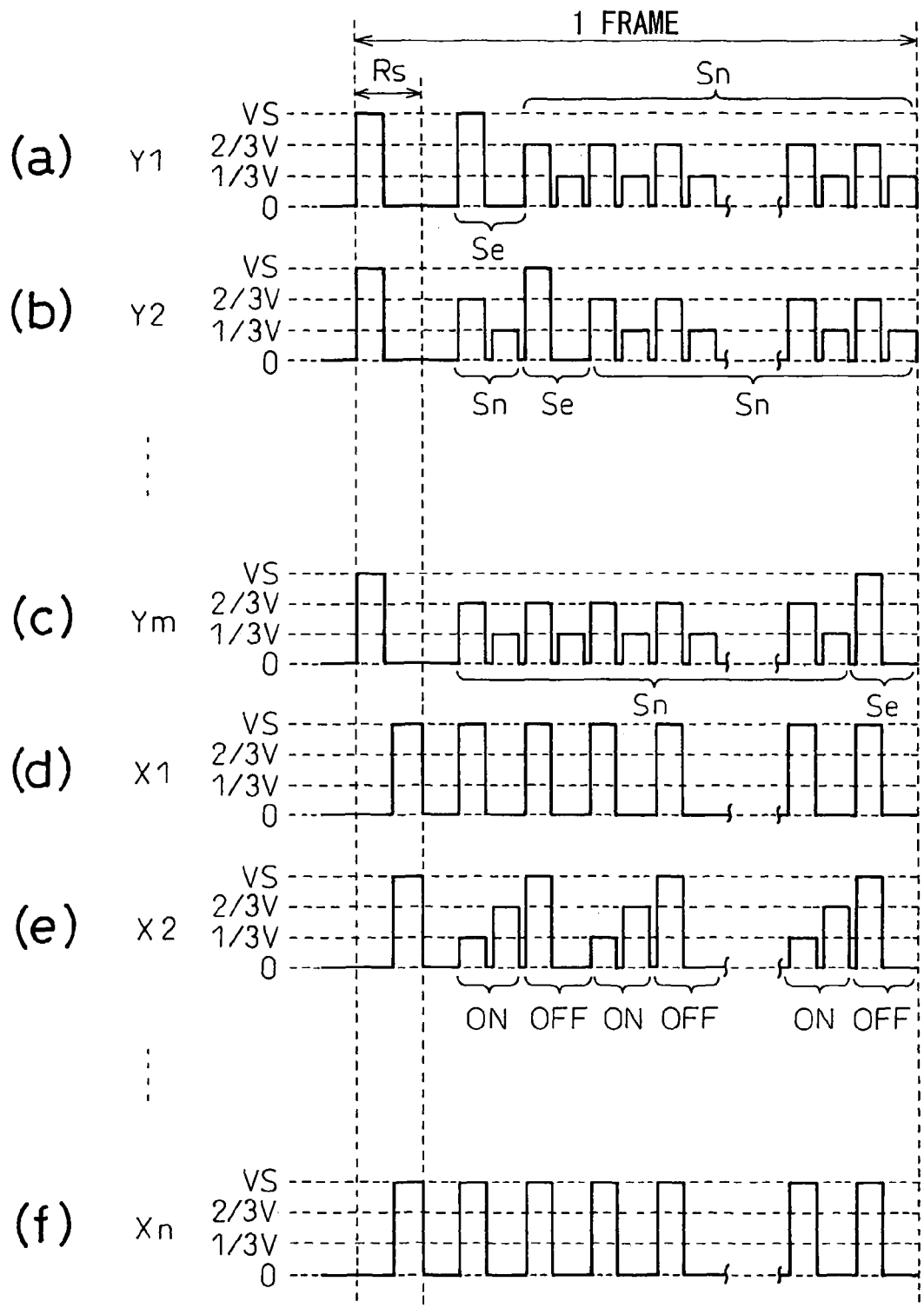
FIG. 11 shows still another example of the driving voltage application method to be implemented in the liquid crystal display device in accordance with the present invention.

FIG. 11 shows the fourth example of waveforms of driving voltages which the control unit 21 applies so as to control a color to be displayed in the peripheral area on the surface of the liquid crystal panel 20.

FIG. 11(a) to FIG. 11(c) show the waveforms of voltages to be applied to the scanning electrodes Y1, Y2, and Ym via the scanning driving voltage generation circuit 23 during one frame. FIG. 11(d) to FIG. 11(f) show the waveforms of voltages to be applied to the signal electrodes X1, X2, and Xn via the signal driving voltage generation circuit 24 during one frame.

In the fourth example of waveforms of driving voltages shown in FIG. 11, a so-called simultaneous reset type time-division driving method is adopted. Specifically, a voltage that varies in three steps from a value VS(V) to a value 0 (V) is applied to the scanning electrodes and signal electrodes alike. For example, in the third example of waveforms of driving voltages, a voltage that varies from a positive value to a negative value should be applied to the scanning electrodes and signal electrodes alike. In contrast, in the fourth example of waveforms of driving voltages, a voltage assuming one polarity alone should be applied. Consequently, this example makes it possible to realize the driving voltage generation circuits readily and inexpensively.

As shown in FIG. 11, a reset pulse of a value VS(V) is applied to all the scanning electrodes Y1 to Ym during the first half of a reset period (Rs), and the reset pulse of the value VS(V) is applied to all the signal electrodes S1 to Xn during the second half of the reset period (Rs).

After the reset period has elapsed, a selection signal Se and a non-selection signal Sn are applied to the scanning electrodes Y1 to Ym. The selection pulse Se is a signal that assumes a value +VS(V) and a value 0 (V), and is applied once during one frame. Moreover, the timing of applying the selection pulse Se is shifted by one cycle every time the selection pulse Se is applied orderly to each of the scanning electrodes Y1 to Ym. The non-selection pulse Sn is a signal that assumes a value +⅓ VS(V) and a value +⅔ VS(V), and is applied at all timings other than the timing of applying the selection pulse Se.

Moreover, after the reset period has elapsed, the same pulses as those applied during the reset period Rs are applied to the signal electrodes X1 and Xn. An on-state pulse associated with white display represented by display data and an off-state pulse associated with black display are applied to the signal electrodes X2 to Xn-1. The on-state pulse is a signal that assumes a value +⅔ VS(V) and a value +⅓ VS(V), and the off-state pulse is a signal that assumes a value +VS(V) and a value 0 (V). FIG. 11(*e*) shows an example of the waveform of a signal to be applied to the signal electrode X2 but the signal to be applied to the signal electrode X2 is not limited to the illustrated one.

Figure 12:
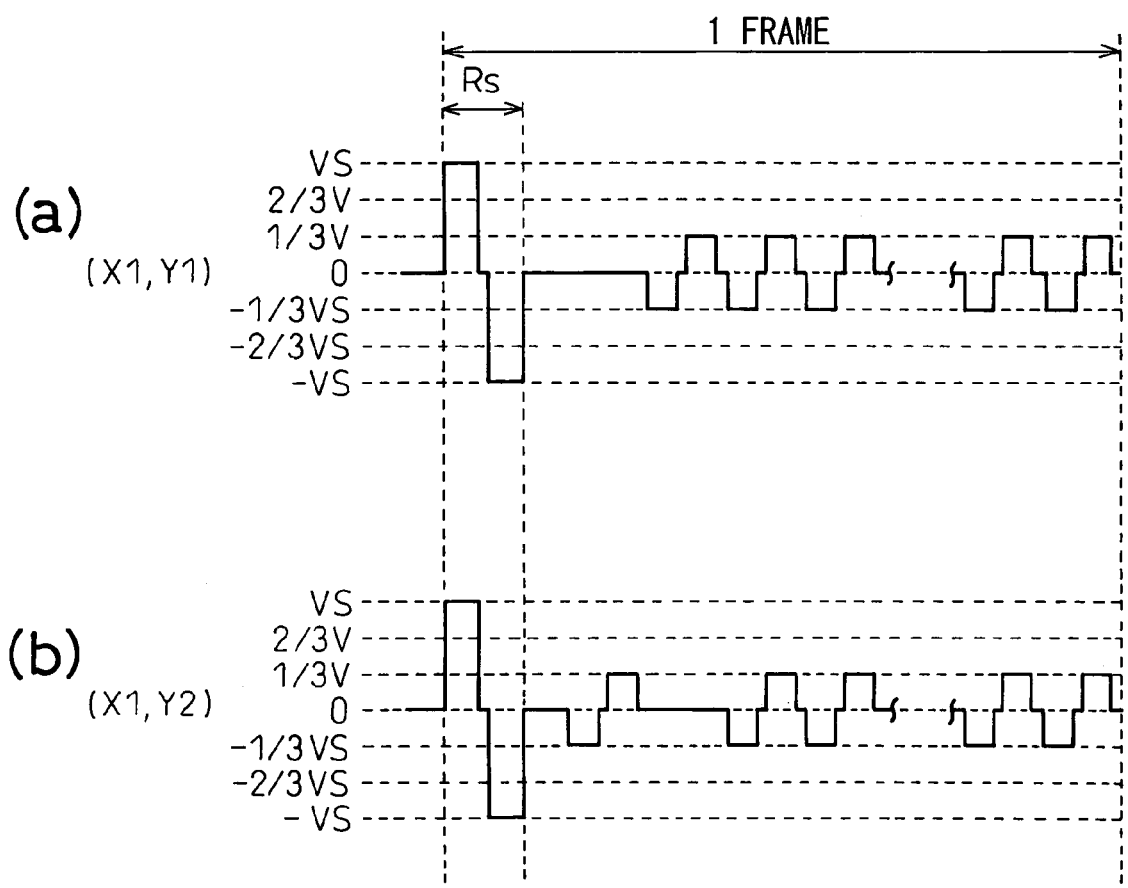
FIG. 12 shows an example of waveforms of driving voltage in FIG. 11.

FIG. 12 shows an example of waveforms of composite driving voltages to be applied to specific pixels after the driving voltages whose waveforms are identical to the fourth example of waveforms are applied. FIG. 12(*a*) shows a waveform of a composite voltage to be applied to a pixel that is a location at a point of intersection between the scanning electrode Y1 and signal electrode X1 shown in FIG. 4. FIG. 12(*b*) shows a waveform of a composite voltage to be applied to a pixel that is a location at a point of intersection between the scanning electrode Y2 and signal electrode X1 shown in FIG. 4.

As shown in FIG. 12(*a*) and FIG. 12(*b*), a waveform of a composite voltage to be applied to each pixel is grasped by time-sequentially observing a value calculated by subtracting the voltage applied to each of the signal electrodes X1 to Xm from the voltage applied to each of the scanning electrodes Y1 to Ym. Therefore, a voltage shown in FIG. 12(*a*) (assuming a value +VS(V) during the first half of the reset period and a value −VS(V) during the second half thereof) is applied to all pixels during the reset period (Rs). In this example, the value +VS(V) corresponds to the value V2(V) in FIG. 2, and the value −VS(V) corresponds to the value V4(V) in FIG. 2. Consequently, a voltage whose value is equal to or larger than the threshold V2 (see FIG. 2) is applied to both the areas (the display area and peripheral area), which have the scanning electrodes and signal electrodes arranged in association therewith, during the first half of the reset period. A voltage whose value is equal to or smaller than the threshold V4 (see FIG. 2) is applied to both the areas during the second half of the reset period. Thus, both the areas are brought to the second ferroelectric state (black display).

Moreover, the pixels to which the voltages whose waveforms are shown in FIG. 12(*a*) and FIG. 12(*b*) respectively are applied are locations associated with the peripheral area. Therefore, after the reset period (Rs) has elapsed, neither the composite voltage of the value +VS(V) nor the composite voltage of the value −VS(V) is applied to the pixels. Consequently, the polarities of the memory-type liquid crystal at the locations of the pixels will not be reversed. In other words, after the reset period has elapsed, a driving voltage that does not cause the memory-type liquid crystal to reverse its polarity is applied in order to sustain a state established during the reset period. Incidentally, FIG. 12(*a*) and FIG. 12(*b*) show the waveforms of the voltages to be applied to the pixels (X1,Y1) and (X1,Y2) alone. After the reset period has elapsed, the driving voltage that does not cause the memory-type liquid crystal to reverse its polarity is also applied to the other pixels associated with the peripheral area in order to sustain the state established during the reset period.

Incidentally, FIG. 11 does not show a waveform of a driving voltage to be applied to the scanning electrodes Y3 to Ym-1 and the signal electrodes X3 to Xn-1. A composite driving voltage produced by synthesizing a predetermined selection pulse or non-selection pulse with a signal pulse is applied to the electrodes. Information corresponding to time data received from the timepiece 50 is displayed in the display area (710 in FIG. 7) on the liquid crystal panel 20.

As mentioned above, at least four methods may be adopted in order to control a color to be displayed in the peripheral area (720 in FIG. 7) coinciding with the portion of the liquid crystal controlled by the scanning electrodes in peripheral area Y1 and Ym and the outermost signal electrodes in peripheral area X1 and Xn. According to the four methods, the portion of the liquid crystal coinciding with the peripheral area is controlled so that it will display white. Alternatively, the portion of the liquid crystal coinciding with the peripheral area may be controlled so that it will display the same color as a background color displayed in the display area. For example, the control unit 21 may count the number of pixels that will exhibit the same color on the basis of display data based on which an image is displayed in the display area, so that the portion of the memory-type liquid crystal 10 coinciding with the peripheral area will display the color which the largest number of pixels exhibits.

Moreover, any of the pixels contained in the display area may be designated as an index pixel (for example, 740 in FIG. 7), and the portion of the liquid crystal coinciding with the peripheral area may be controlled to produce the color exhibited by the index pixel. Incidentally, the index pixel may be one pixel or include a plurality of pixels. If the index pixel includes a plurality of pixels, a mean density offered by the plurality of pixels is calculated and the portion of the liquid crystal coinciding with the peripheral area is controlled to provide the mean density.

In principle, a display color to be produced by the portion of the liquid crystal coinciding with the peripheral area should be determined only at the time of initializing the liquid crystal panel 20. This is because, when the power supply of the liquid crystal panel 20 is turned on, the ferroelectric liquid crystal 10 should only be controlled to sustain a designated state. However, when the timepiece 50 transmits an all-reset signal, with which the liquid crystal panel 20 is reset, after the completion of overhaul, assembling, or repair, the power supply of the liquid crystal panel 20 is also reset. This may make the ferroelectric liquid crystal 10 unstable. Therefore, when the timepiece 50 transmits the all-reset signal, a display color to be produced by the portion of the liquid crystal coinciding with the peripheral area should preferably be re-designated. Specifically, the control unit 21 is designed to detect the all-reset signal sent from the timepiece 50. If the control unit 21 detects the all-reset signal, the control unit designates a display color to be produced by the portion of the liquid crystal coinciding with the peripheral area according to one of the four methods described in conjunction with FIG. 8 to FIG. 12.

In the examples of waveforms of driving voltages shown in FIG. 8 to FIG. 11, one frame includes the reset period. Alternatively, the reset period may be included as the leading part of the frame. The frame may be defined as a period elapsing until a charge is applied to all the scanning driving electrodes, and the reset period may be defined as a period needed to reset the memory-type liquid crystal.

Figure 13:
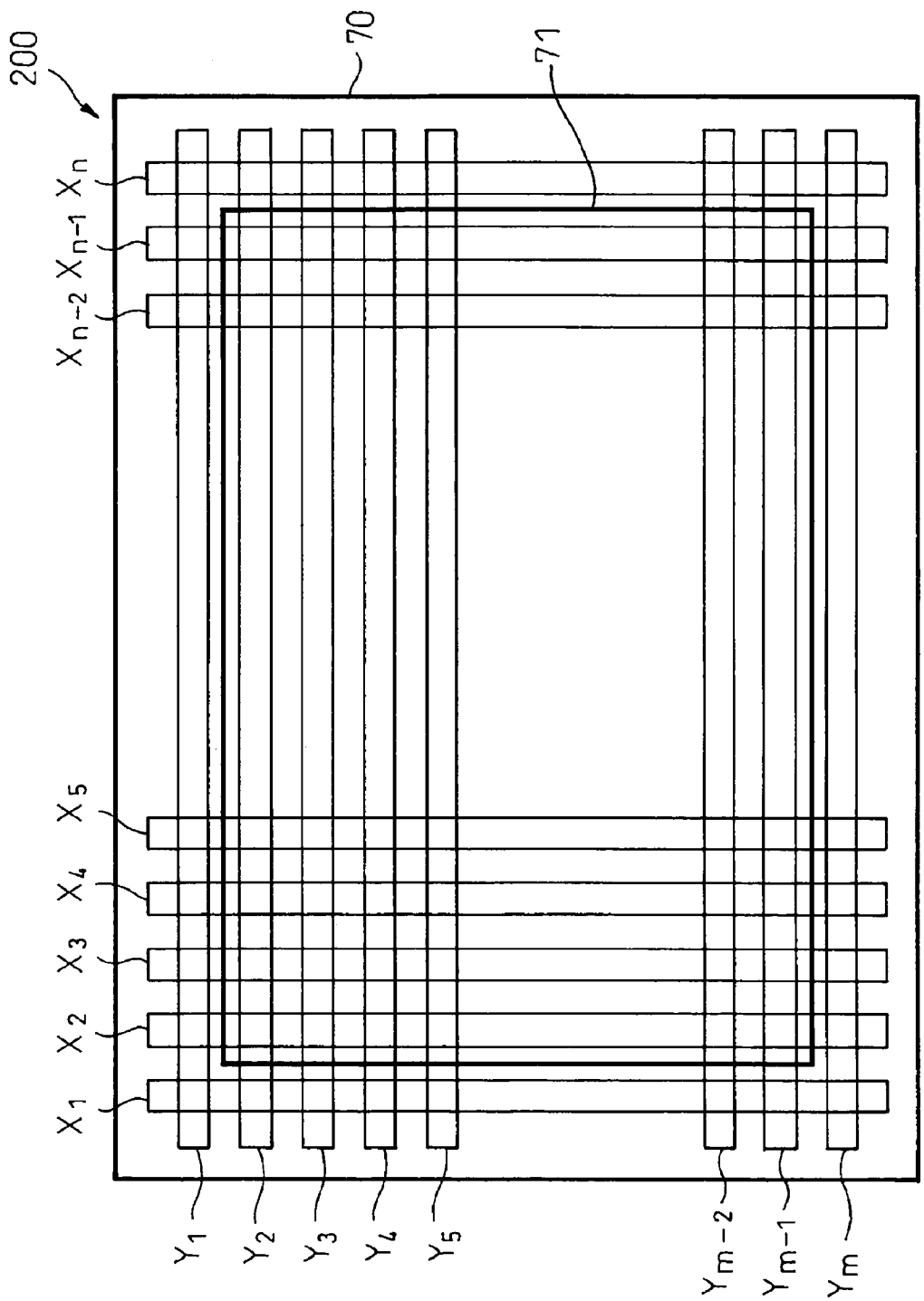
FIG. 13 shows another example of arrangement of driving electrodes incorporated in a liquid crystal panel.

FIG. 13 shows another example of arrangement of scanning electrodes 13*a* and signal electrodes 13*b* in a liquid crystal panel 200.

In the example shown in FIG. 13, thirty-five scanning electrodes 13*a* (Y1 to Ym) and fifty-two signal electrodes 13*b* (X1 to Xn) are included. The liquid crystal panel 20 shown in FIG. 4 has the outermost scanning electrodes in peripheral area Y1 and Ym associated with the upper and lower parts of the peripheral area respectively, and has the outermost signal electrodes in peripheral area X1 and Xn associated with the right and left parts thereof respectively. In contrast, the liquid crystal panel 200 shown in FIG. 13 has pairs of scanning electrodes Y1 and Y2 and scanning electrodes Ym-1 and Ym associated with the upper and lower parts of the peripheral area respectively, and has pairs of signal electrodes X1 and X2 and signal electrodes Xn-1 and Xn associated with the right and left parts thereof respectively. Moreover, the width of the scanning electrodes and signal electrodes associated with the peripheral area is identical to that of the electrodes associated with the display area. Incidentally, the number of pixels contained in the display area on the liquid crystal panel 200 is 1457 and is identical to that of pixels contained in the display area on the liquid crystal panel 20 shown in FIG. 4.

Assuming that the example of a display shown in FIG. 7 is achieved on the liquid crystal panel 200 shown in FIG. 13, scanning electrodes in display area Y3 to Ym-2 and signal electrodes in display area X3 to Xn-2 are associated with the display area 710. Scanning electrodes in peripheral area Y1, Y2, Ym-1, and Ym and signal electrodes in peripheral area X1, X2, Xn-1, and Xn are associated with the peripheral area 720.

When the liquid crystal panel 200 shown in FIG. 13 is employed, the same driving voltage as the driving voltage applied to the scanning electrode Y1 included in the liquid crystal panel 20 shown in FIG. 4 is applied to the scanning electrodes Y1 and Y2 included in the liquid crystal panel 200. The same driving voltage as the driving voltage applied to the scanning electrode Ym included in the liquid crystal panel 20 shown in FIG. 4 is applied to the scanning electrodes Ym-1 and Ym included in the liquid crystal panel 200. The same driving voltage as the driving voltage applied to the signal electrode X1 included in the liquid crystal panel 20 shown in FIG. 4 is applied to the scanning electrodes X1 and X2 included in the liquid crystal panel 200. The same driving voltage as the driving voltage applied to the signal electrode Xn included in the liquid crystal panel 200 shown in FIG. 4 is applied to the signal electrodes Xn-1 and Xn included in the liquid crystal panel 200. The other methods of controlling the liquid crystal panel 200 shown in FIG. 13 are identical to those of controlling the liquid crystal panel 20 shown in FIG. 4.

As mentioned above, a plurality of scanning electrodes in peripheral area or a plurality of signal electrodes in peripheral area may be included. In this case, the boundary of the opening 71 of the view plate 70 is aligned with a center line that extends in the middle in width of the scanning electrodes in peripheral area Y1 and Y2, that is, is interposed between the electrodes Y1 and Y2. Likewise, the boundary of the opening 71 of the view plate 70 is interposed between the scanning electrodes in peripheral area Ym-1 and Ym, between the signal electrodes in peripheral area X1 and X2, and between the signal electrodes in peripheral area Xn-1 and Xn respectively.

Moreover, sheet polarizers are, as shown in FIG. 7, disposed to cover both the display area 710 and the peripheral area 720 but do not cover the uncontrolled area 730 outside the peripheral area. Namely, the sheet polarizers that are smaller in size than the substrates are disposed so that the external boundaries thereof will be extended outside the scanning electrodes in peripheral area Y1 and Ym and the signal electrodes in peripheral area X1 and Xn which are located at outermost positions. Namely, the sheet polarizers are disposed to cover the display area and peripheral area.

In FIG. 13, two electrodes located at outermost positions are functioned as scanning electrodes in peripheral area or signal electrodes in peripheral area. Alternatively, three or more outermost electrodes may be functioned as the scanning electrodes in peripheral area or signal electrodes in peripheral area. Moreover, an electrode located at an outermost position may not always be used as a peripheral area electrode. For example, when the display area is smaller, the number of scanning electrodes or signal electrodes associated with the outside of the display area is larger. In this case, all the electrodes associated with the perimeter of the display area need not be used as the peripheral area electrodes. Specifically, among all the electrodes shown in FIG. 13, the scanning electrodes Y4 to Ym-3 may be adopted as scanning electrodes in display area, and the signal electrodes X4 to Xn-3 may be adopted as signal electrodes in display area. In this case, an image represented by display data is not displayed in an area associated with the other scanning electrodes Y1, Y2, Y3, Ym-2, Ym-1, and Ym and the signal electrodes X1, X2, X3, Xn-2, Xn-1, and Xn.

Among the scanning electrodes and signal electrodes, the scanning electrodes Y2, Y3, Ym-2, and Ym-1 are used as scanning electrodes in peripheral area, and the signal electrodes X2, X3, Xn-2, and Xn-1 are used as signal electrodes in peripheral area. One of the four driving methods described in conjunction with FIG. 8 to FIG. 12 is used to designate a color to be displayed in the peripheral area. The scanning electrodes Y1 and Ym and signal electrodes X1 and Xn which are located at outermost positions are associated with an uncontrolled area outside the peripheral area. No voltage is applied to the scanning electrodes Y1 and Ym and signal electrodes X1 and Xn, nothing is displayed in the uncontrolled area, and a color to be displayed in the area is not designated. Namely, the scanning electrodes in peripheral area and signal electrodes in peripheral area refer to electrodes to which the driving voltages shown in FIG. 8 to FIG. 12 are applied and which are associated with an area having a color to be displayed therein designated.

As mentioned above, when a plurality of scanning electrodes in peripheral area and a plurality of perimetric signal electrodes are disposed, the boundary of the opening formed in the view plate is aligned with a center line that extends in the middle in width of the plurality of scanning electrodes associated with the peripheral area. Moreover, sheet polarizers are disposed not to cover the uncontrolled area. Consequently, although electrodes are associated with the uncontrolled area, no voltage is applied to the electrodes and the sheet polarizers do not cover the uncontrolled area. Therefore, nothing is displayed in the uncontrolled area.

In relation to the present embodiment, the disposition of sheet polarizers that are optically functional films has been described. The same applies to a case where phase difference plates are adopted as the optically functional films.

The ferroelectric liquid crystal 10 should be controlled so that when the power supply of the liquid crystal panel 20 is turned on, the ferroelectric liquid crystal 10 will sustain a designated state. In principle, a display color to be produced by the portion of the liquid crystal coinciding with the peripheral area should be designated only at the time of initializing the liquid crystal panel 20 (at the time of initially applying a voltage to scanning electrodes and signal electrodes). However, when the timepiece 50 transmits an all-reset signal, with which the liquid crystal panel 20 is reset, after the completion of overhaul, assembling, or repair, the power supply of the liquid crystal panel 20 is also reset. This makes the ferroelectric liquid crystal 10 unstable. Therefore, preferably, when the timepiece 50 transmits the all-reset signal, a display color to be produced by the portion of the liquid crystal coinciding with the peripheral area should be re-designated. Specifically, the control unit 21 is designed to detect the all-reset signal sent from the timepiece 50. If the control unit 21 detects the all-reset signal, the control unit designates the display color to be produced by the portion of the liquid crystal coinciding with the peripheral area according to one of the four methods described in conjunction with FIG. 8 to FIG. 12.

Moreover, the memory-type liquid crystal is known to assume a plurality of phases according to an ambient temperature. For example, when the memory-type liquid crystal is brought to a phase for normal display, it has the capability of a memory. When the temperature rises, if the memory-type liquid crystal makes a transition to other phase, it may lose the capability of a memory.

Figure 14:
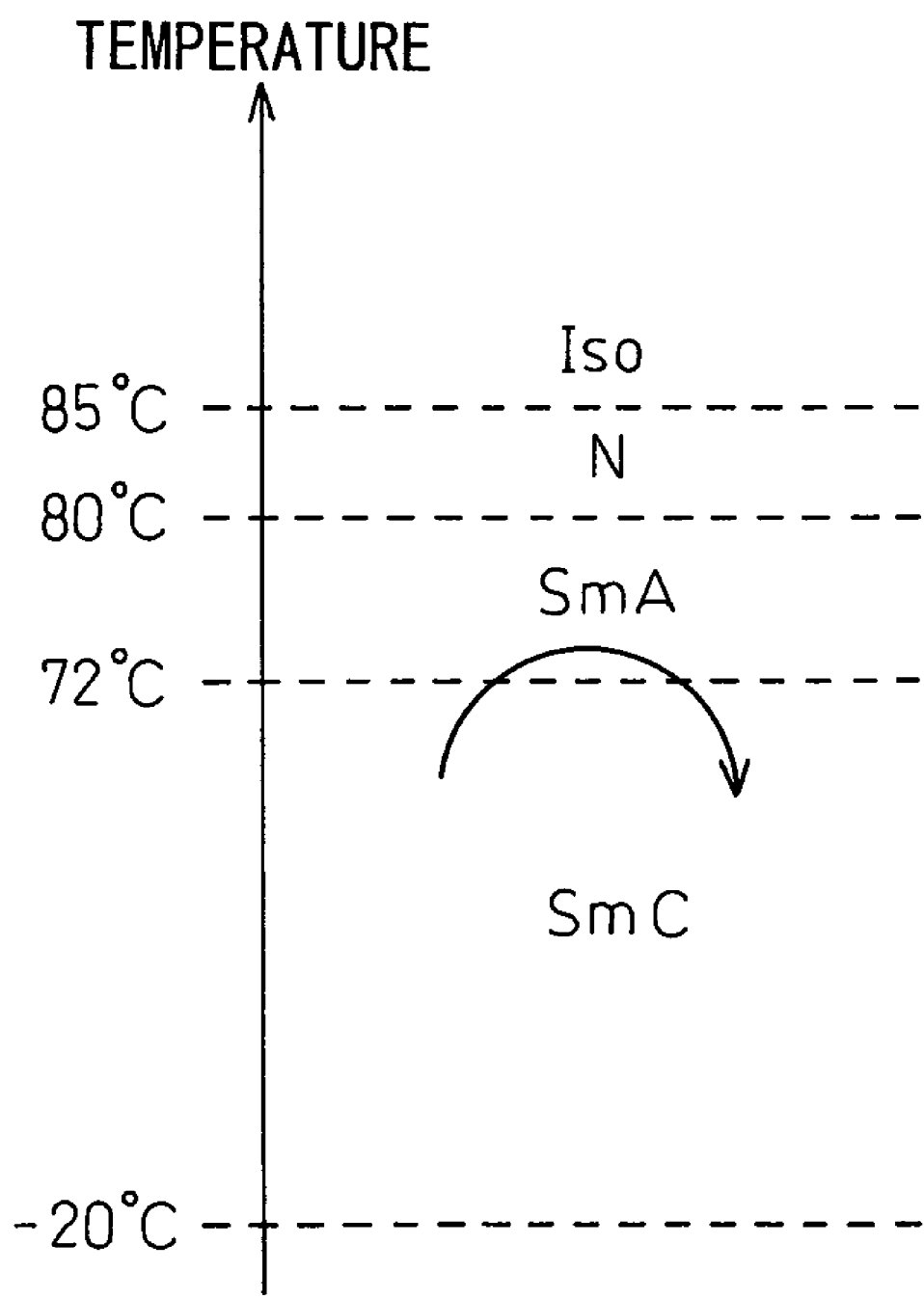
FIG. 14 shows the temperature characteristic of a ferroelectric liquid crystal.

FIG. 14 shows the temperature characteristic of the ferroelectric liquid crystal 10 employed in the present embodiment.

Figure 2:
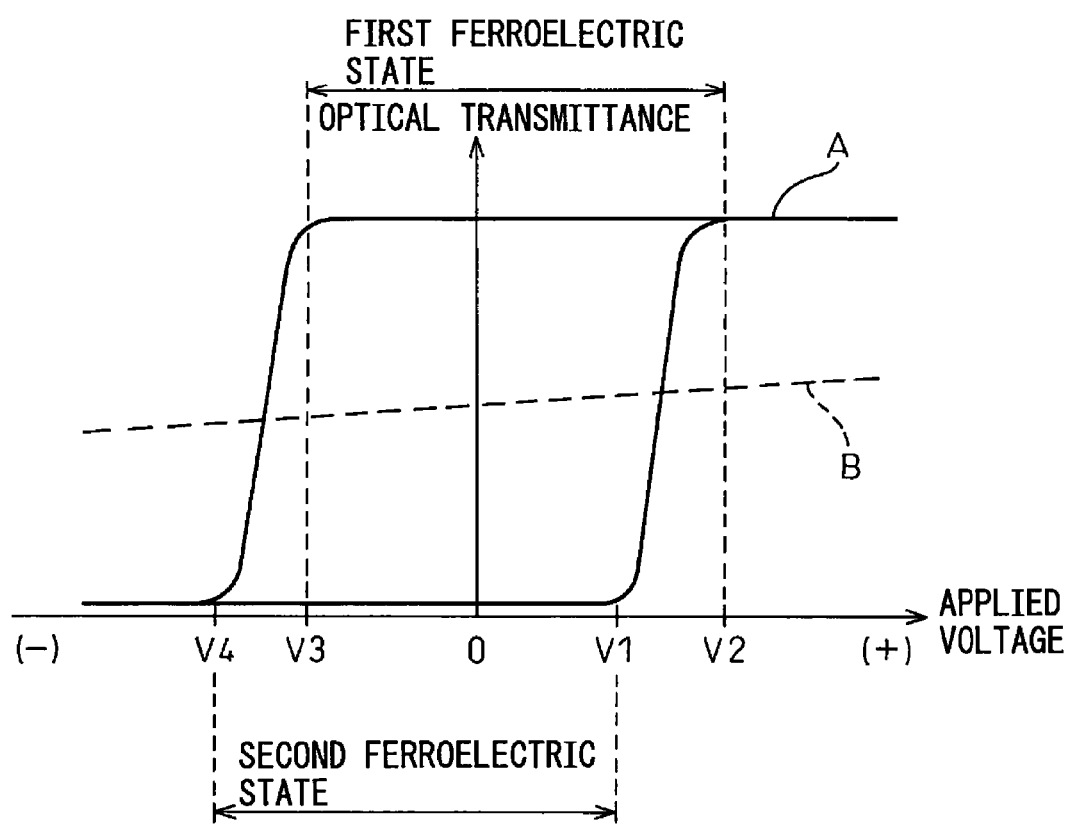
FIG. 2 shows the relationship between a voltage applied to a memory-type liquid crystal and an optical transmittance.

When the ambient temperature ranges from −20° C. to 72° C., the ferroelectric liquid crystal 10 stays in a smectic C phase and exhibits a hysteresis indicated with the curve A in FIG. 2. When the temperature ranges from 72° C. to 80° C., the ferroelectric liquid crystal stays in a smectic A phase. When the temperature ranges from 80° C. to 85° C., the ferroelectric liquid crystal stays in a nematic phase. When the temperature is equal to or higher than 85° C., the ferroelectric liquid crystal is isotropic. The temperature causing the ferroelectric liquid crystal to make a transition from a predetermined phase to any other phase is referred to as a transition temperature.

When the ambient temperature becomes equal to or higher than 72° C. (phase transition temperature), the ferroelectric liquid crystal 10 is characterized by a change in an amount of transmitted light directly proportional to a change in an applied voltage which is indicated with a line B in FIG. 2. This characteristic cancels the capability of a memory exhibited in the smectic C phase. After the ambient temperature of the liquid crystal panel 20 becomes equal to or higher than 72° C., if the temperature decreases to restore the ferroelectric liquid crystal 10 to the smectic C phase (arrow in FIG. 14), the ferroelectric liquid crystal 10 exhibits the capability of a memory again. However, after the ferroelectric liquid crystal is restored to the smectic C phase, it does not always reenter a state which the ferroelectric liquid crystal has sustained before making a transition to the smectic A phase.

Preferably, after the ferroelectric liquid crystal 10 has changed to the smectic A phase, if it is restored to the smectic C phase, a temperature sensor (41 in FIG. 5) is used to re-designate a display color to be produced by the portion of the liquid crystal coinciding with the peripheral area. Specifically, the control unit 21 detects a temperature signal sent from the temperature sensor 41. If the temperature signal signifies that the ambient temperature has become equal to or higher than 72° C. and then has fallen below 72° C., one of the four methods described in conjunction with FIG. 8 to FIG. 12 is used to designate a display color to be produced by the portion of the liquid crystal coinciding with the peripheral area.

What is claimed is:

1. A memory-type liquid crystal display device having a display area and a peripheral area located on the perimeter of the display area, comprising:
    a memory-type liquid crystal provided between first and second substrates and having a first stable state and a second stable state;
    a first pixel disposed on the display area;
    a second pixel disposed on the peripheral area; and
    a control unit that
        applies a reset pulse to a portion of the memory-type liquid crystal corresponding to the first and second pixels so that the portion of the memory-type liquid crystal corresponding to the first and second pixels becomes one of the first and second stable states at a reset period which resets a state of the memory-type liquid crystal, and
        controls the memory-type liquid crystal corresponding to the second pixel so that the portion of the memory-type liquid crystal corresponding to the second pixel maintains its stable state of the reset period, without using display data, at a frame period after the reset period;
    wherein the control unit detects a display color exhibited by an index pixel contained in the display area, and applies the reset pulse to the memory-type liquid crystal so that the portion of the memory-type liquid crystal coinciding with the peripheral area will produce the same display color as the display color exhibited by the index pixel, or
    the control unit detects a display color exhibited by the largest number of pixels contained in the display area, and applies the reset pulse to the memory-type liquid crystal so that the portion of the memory-type liquid crystal coinciding with the peripheral area will produce the same display color as the display color exhibited by the largest number of pixels.

2. The memory-type liquid crystal display device according to claim 1, further comprising:
    a scanning electrode in display area provided at a position corresponding to the first pixel;
    a signal electrode in display area provided at a position corresponding to the first pixel;
    a scanning electrode in peripheral area provided outside of the display area and corresponding to the second pixel; and
    a signal electrode in peripheral area provided outside of the display area and corresponding to the second pixel; and
    wherein the control unit applies a voltage more than the threshold voltage, which reverses the state of the memory-type liquid crystal between the first and second stable state, to the scanning electrode in display area, the signal electrode in display area, the scanning electrode in peripheral area, and the signal electrode in peripheral area corresponding to the second pixel.

3. The memory-type liquid crystal display device according to claim 1, further comprising:
    a scanning electrode in display area provided at a position corresponding to the first pixel;
    a signal electrode in display area provided at a position corresponding to the first pixel;
    a scanning electrode in peripheral area provided outside of the display area and corresponds to the second pixel; and
    a signal electrode in peripheral area provided outside of the display area and corresponds to the second pixel; and
    wherein the control unit applies a reset pulse and a selection pulse to the scanning electrode in display area, applies a data pulse to the signal electrode in display area, only applies the reset pulse to the scanning electrode in peripheral area, and only applies the reset pulse to the signal electrode in peripheral area, so that the portion of the memory-type liquid crystal corresponding to the second pixel becomes one of the first and second stable states and the portion of the memory-type liquid crystal corresponding to the first pixel becomes one of the first and second stable states according to the selection pulse and data pulse.

4. The memory-type liquid crystal display device according to claim 3, wherein the control unit applies the reset pulse simultaneously to the scanning electrodes in peripheral area and signal electrodes in peripheral area.

5. The memory-type liquid crystal display device according to claim 3, wherein the control unit applies the reset pulse to the scanning electrode in peripheral area and the signal electrode in peripheral area at different timings.

6. The memory-type liquid crystal display device according to claim 3 wherein, when a voltage is initially applied to the scanning electrode in display area and signal electrode in display area, the control unit applies the reset pulse to the scanning electrodes in display area, signal electrodes in display area, scanning electrode in peripheral area, or signal electrode in peripheral area so as to bring the portion of the memory-type liquid crystal corresponding to the peripheral area to one of the first and second states.

7. The memory-type liquid crystal display device according to claim 3, further comprising a temperature sensor that detects the temperature of the memory-type liquid crystal, and wherein, when the temperature sensor detects a predetermined temperature, the control unit applies the reset pulse to the scanning electrode in display area, signal electrodes in display area, scanning electrode in peripheral area, or signal electrode in peripheral area so as to bring the portion of the memory-type liquid crystal corresponding to the peripheral area to one of the first and second stable states.

8. The memory-type liquid crystal display device according to claim 3, further comprising a reset pulse generating circuit that generates an all-reset pulse with which the memory-type liquid crystal display device is reset, and wherein, when the reset pulse generating circuit generates the all-reset pulse, the control unit applies the reset pulse to the scanning electrode in display area, signal electrodes in display area, scanning electrode in peripheral area, or signal electrodes in peripheral area so as to bring the portion of the memory-type liquid crystal coinciding with the peripheral area to one of the first and second stable states.

9. The memory-type liquid crystal display device according to claim 1, further comprising:

a scanning electrode in display area provided at a position corresponding to the first pixel;

a signal electrode in display area provided at a position corresponding to the first pixel;

a scanning electrode in peripheral area provided outside of the display area and corresponding to the second pixel; and a signal electrode in peripheral area provided outside of the display area and corresponding to the second pixel; and wherein the control unit applies a reset pulse and a selection pulse to the scanning electrode in display area, applies a data pulse to the signal electrode in display area, applies the reset pulse to the scanning electrodes in peripheral area, and does not apply the reset pulse and signal pulse to the signal electrode in peripheral area, so that the portion of the memory-type liquid crystal corresponding to the second pixel becomes one of the first and second stable states and the portion of the memory-type liquid crystal corresponding to the first pixel becomes one of the first and second stable states according to the selection pulse and data pulse.

10. The memory-type liquid crystal display device according to claim 9, wherein the control unit applies the reset pulse simultaneously to the scanning electrode in peripheral area and the signal electrodes in peripheral area.

11. The memory-type liquid crystal display device according to claim 9, wherein the control unit applies the reset pulse to the scanning electrode in peripheral area and the signal electrode in peripheral area at different timings.

12. The memory-type liquid crystal display device according to claim 9, wherein, when a voltage is initially applied to the scanning electrode in display area and signal electrode in display area, the control unit applies the reset pulse to the scanning electrode in display area, the signal electrode in display area, the scanning electrode in peripheral area, or the signal electrodes in peripheral area so as to bring the portion of the memory-type liquid crystal coinciding with the peripheral area to one of the first and second stable states.

13. The memory-type liquid crystal display device according to claim 9, further comprising a temperature sensor that detects the temperature of the memory-type liquid crystal, and wherein, when the temperature sensor detects a predetermined temperature, the control unit applies the reset pulse to the scanning electrode in display area, signal electrode in display area, scanning electrodes in peripheral area, or signal electrode in peripheral area so as to bring the portion of the memory-type liquid crystal coinciding with the peripheral area to one of the first and second stable states.

14. The memory-type liquid crystal display device according to claim 9, further comprising a reset pulse generating circuit that generates an all-reset pulse with which the memory-type liquid crystal display device is reset, and wherein, when the reset pulse generating circuit generates the all-reset pulse, the control unit applies the reset pulse to the scanning electrode in display area, the signal electrode in display area, the scanning electrode in peripheral area, or the signal electrodes in peripheral area so as to bring the portion of the memory-type liquid crystal coinciding with the peripheral area to one of the first and second stable states.

15. The memory-type liquid crystal display device according to claim 9, wherein the control unit detects a display color exhibited by an index pixel contained in the display area, and applies the reset pulse to the scanning electrode in display area, the signal electrode in display area, the scanning electrodes in peripheral area, or the signal electrode in peripheral area so that the portion of the memory-type liquid crystal coinciding with the peripheral area will produce the same display color as the display color exhibited by the index pixel.

16. The memory-type liquid crystal display device according to claim 9, wherein the control unit detects a display color exhibited by the largest number of pixels contained in the display area, and applies the reset pulse to the scanning electrodes in display area, signal electrode in display area, scanning electrodes in peripheral area, or signal electrode in peripheral area so that the portion of the memory-type liquid crystal coinciding with the peripheral area will produce the same display color as the color exhibited by the largest number of pixels.

17. The memory-type liquid crystal display device according to claim 1, further comprising:

a scanning electrode in display area provided at a position corresponding to the first pixel;

a signal electrode in display area provided at a position corresponding to the first pixel;

a scanning electrode in peripheral area provided outside of the display area and corresponding to the second pixel; and a signal electrode in peripheral area provided outside of the display area and corresponding to the second pixel; and wherein the control unit applies a reset pulse and a selection pulse to the scanning electrode in display area, applies a data pulse to the signal electrodes in display area, applies the reset pulse to the scanning electrode in peripheral area, and applies the reset pulse to the signal electrode in peripheral area, so that the portion of the memory-type liquid crystal corresponding to the second pixel becomes one of the first and second stable states continuously.

18. The memory-type liquid crystal display device according to claim 1, further comprising a view plate which covers a periphery of the first or second substrate and is placed on the external side of the first or second substrate, and wherein the boundary of an opening formed in the view plate is positioned on the periphery area.

19. The memory-type liquid crystal display device according to claim 18, wherein the boundary of the opening formed in the view plate is aligned with a center line that bisects, in width, each of the scanning electrodes in peripheral area and signal electrode in peripheral area associated with the peripheral area.

20. The memory-type liquid crystal display device according to claim 18, further comprising an optically functional film placed on the external side of the first or second substrate, and wherein the optically functional film is disposed at a position associated with the display area and peripheral area alike but is not disposed at an uncontrolled area surrounding the peripheral area.

* * * * *